(12) United States Patent
Steinbach et al.

(10) Patent No.: US 8,902,996 B2
(45) Date of Patent: Dec. 2, 2014

(54) ADAPTIVE WIRELESS VIDEO TRANSMISSION SYSTEMS AND METHODS

(75) Inventors: Eckehard Goetz Steinbach, Olching (DE); Fan Zhang, München (DE); Yang Peng, München (DE); Wei-Kung Deng, Taipei (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 691 days.

(21) Appl. No.: 13/274,081

(22) Filed: Oct. 14, 2011

(65) Prior Publication Data

US 2012/0079329 A1   Mar. 29, 2012

Related U.S. Application Data

(63) Continuation-in-part of application No. 12/110,570, filed on Apr. 28, 2008, now Pat. No. 8,265,171.

(60) Provisional application No. 61/031,490, filed on Feb. 26, 2008.

(51) Int. Cl.
*H04N 7/12* (2006.01)
*H04N 11/02* (2006.01)
(Continued)

(52) U.S. Cl.
CPC ... *H04N 19/00127* (2013.01); *H04N 19/00242* (2013.01); *H04N 19/00278* (2013.01); *H04N 19/0009* (2013.01); *H04N 19/00939* (2013.01)
USPC ............ 375/240.27; 375/240.02; 375/240.07; 714/748; 714/749; 714/750; 714/751; 714/752

(58) Field of Classification Search
CPC ..... H04L 1/203; H04L 1/0009; H04L 1/0025; H04L 1/0007; H04L 1/0014; H04L 1/0015; H04L 1/0071; H04L 1/0079; H04L 1/0083; H04L 1/1812; H04N 19/00242; H04N 19/00933; H04N 19/00939; H04N 19/00854; H04N 7/68; H04N 7/26234
USPC ........ 375/240.01–240.29; 714/704, 746, 748, 714/758, 762, 776, 749, 751, 752
See application file for complete search history.

(56) References Cited

U.S. PATENT DOCUMENTS 5,768,527 A    6/1998 Zhu et al.
2001/0019589 A1    9/2001 Kim et al.
(Continued)

FOREIGN PATENT DOCUMENTS

EP    1202487 A2 *  5/2002
EP    1 638 234 A1    3/2006

OTHER PUBLICATIONS

Extended European Search Report for Application No. 12188339.1, dated Jul. 10, 2013.
(Continued)

*Primary Examiner* — Sath V Perungavoor
*Assistant Examiner* — Nathnael Aynalem
(74) *Attorney, Agent, or Firm* — Winston Hsu; Scott Margo

(57) ABSTRACT

A method for providing error-resilient video content may include receiving video data reflective of multiple video frames and encoding the video data to generate a plurality of packets. The method may also include transmitting the first group of packets to at least two receivers and receiving feedback information regarding receiving status of respective ones of the plurality of packets, the feedback information being indicative of packets not received correctly. The method may further include examining error indications based on the feedback information and implementing a first error-correction policy if a variation in the error indications among the at least two receivers is below a first error threshold and a second error-correction policy if the variation is above the first error threshold. At least one of the first and second error-correction policies may include transmitting or retransmitting at least one packet using a different coding scheme.

39 Claims, 15 Drawing Sheets

(51) Int. Cl.
*H04N 19/132* (2014.01)
*H04N 19/166* (2014.01)
*H04N 19/176* (2014.01)
*H04N 19/124* (2014.01)
*H04N 19/89* (2014.01)

(56) References Cited

U.S. PATENT DOCUMENTS

| | | |
|---|---|---|
| 2003/0014705 A1 | 1/2003 | Suzuki et al. |
| 2003/0126238 A1 | 7/2003 | Kohno et al. |
| 2003/0195979 A1* | 10/2003 | Park .............................. 709/231 |
| 2005/0123045 A1 | 6/2005 | Hannuksela |
| 2006/0206775 A1 | 9/2006 | Bhaskaran |
| 2007/0153898 A1 | 7/2007 | Yim |
| 2007/0195893 A1 | 8/2007 | Kim et al. |
| 2007/0291788 A1 | 12/2007 | Sammour et al. |
| 2007/0291836 A1 | 12/2007 | Shi et al. |

OTHER PUBLICATIONS

Peng et al., "Error-Resilient Video Transmission for Short-Range Point-to-Point Wireless Communication", Computer Communications and Networks (ICCN), 2010 Proceedings of 19$^{th}$ Int'l Conference, IEEE, Aug. 2, 2010, pp. 1-6.

Wiegand et al., "Multiframe Buffering Syntax for H.26L", 9. VCEG Meeting, Oct. 19-22, 1999, Video Coding Experts Group of ITU-T Sg.16, No. q15l45, Oct. 13, 1999, 4 pages total.

Wang et al., "Error Control and Concealment for Video Communication: A Review", Proceedings of the IEEE, vol. 86, No. 5, May 1, 1998, pp. 974-997.

Zhang et al., "A Cell-Loss Concealment Technique for MPEG-2 Coded Video", IEEE Transactions on Circuits Systems for Video Technology, vol, 10, No. 4, Jun. 2000, pp. 659-665.

Algn et al., "Temporal and Spatial Error Concealment Techniques for Hierarchical MPEG-2 Video Codec", IEEE International Conference on Communication, vol. 3, 1995, pp. 1778-1783.

* cited by examiner

ADAPTIVE WIRELESS VIDEO TRANSMISSION SYSTEMS AND METHODS

This application is a continuation-in-part of U.S. application Ser. No. 12/110,570, filed Apr. 28, 2008 now U.S. Pat. No. 8,265,171, which claims the benefit of U.S. provisional application No. 61/031,490, filed Feb. 26, 2008, both of which are incorporated by reference herein in their entirety.

TECHNICAL FIELD

The disclosed embodiments relate to digital video transmission. More specifically, the disclosed embodiments relate to adaptive video transmissions, including wireless transmission systems and methods that may be applicable for error-resilient, real-time digital video transmissions.

BACKGROUND

Demands for wireless services, including wireless video transmissions, have been increasing. From simple one-way pagers to full function cellular telephony and video transmissions, consumers and users continue to insist on the fastest and most functionally comprehensive technologies. Users are increasingly demanding wireless real-time audio or video content delivery for home, office, or industrial applications, as well as delivery to mobile telephones, smart phones, personal digital assistants (PDAs), laptop computers, or other portable devices. For example, activities in one place, such as video playbacks, babies at homes, customers at stores, and productions at factories, may be transmitted in real time and with good quality to another location. As another example, news, sports and entertainment programming may be distributed without tangled wires.

However, delivering such content with acceptable efficiency, cost, and/or quality is no small task. In transmitting video or other contents in packet form, either by wire or wirelessly, one of the major issues for real-time audio or video transmissions is packet loss. Packets may be lost during transmissions for various reasons, such as bit errors due to physical links in a network, interferences, buffering and processing capabilities at network nodes, channel conditions, etc. In a wireless environment, signals may be interfered or impacted, and packets may be lost due to physical structures (e.g., mountains, buildings, etc.), weather conditions, interfering or overlapping wireless signals, distance, etc.

It may be desirable to have systems and methods that may improve the delivery of content, such as real-time audio and/or video content, to one or more devices, such as wireless devices.

SUMMARY

The disclosed embodiments provide a method for providing error-resilient video content. The method may include receiving video data reflective of multiple video frames and encoding, with an encoding device, the video data to generate a plurality of packets representing a video frame. The method may also include transmitting the first group of packets to at least two receivers and receiving, from the at least two receivers, feedback information regarding receiving status of respective ones of the plurality of packets, the feedback information being indicative of packets not received correctly. The method may further include examining error indications regarding the at least two receivers based on the feedback information received from the at least two receivers and implementing a first error-correction policy if a variation in the error indications among the at least two receivers is below a first error threshold and a second error-correction policy if the variation is above the first error threshold. At least one of the first and second error-correction policies may include transmitting or retransmitting at least one packet using a coding scheme different from a scheme in encoding the plurality of packets already.

The disclosed embodiments also provide a system for providing error-resilient video. The system may include an encoder configured to receive video data reflective of multiple video frames and to encode the video data to generate a plurality of packets representing a video frame. The encoder may also be coupled with a transmitting device, which is configured to transmit the first group of packets to at least two receivers and to receive, from the at least two receivers, feedback information regarding receiving status of respective ones of the plurality of packets, the feedback information being indicative of packets not received correctly. The encoder may further be coupled with a processor, which may be configured to examine error indications regarding the at least two receivers based on the feedback information received from the at least two receivers and to implement a first error-correction policy if a variation in the error indications among the at least two receivers is below a first error threshold and a second error-correction policy if the variation is above the first error threshold. At least one of the first and second error-correction policies comprises transmitting or retransmitting at least one packet using a coding scheme different from a scheme in encoding the plurality of packets already.

The disclosed embodiments also provide a tangibly embodied computer-readable storage medium including instructions that, when executed by a processor, perform the method described above or to enable a system described above for providing error-resilient digital video.

BRIEF DESCRIPTION OF THE DRAWINGS

Embodiments of the present disclosure will now be described, by way of example only, with reference to the attached drawings, wherein.

DETAILED DESCRIPTION

Figure 1:
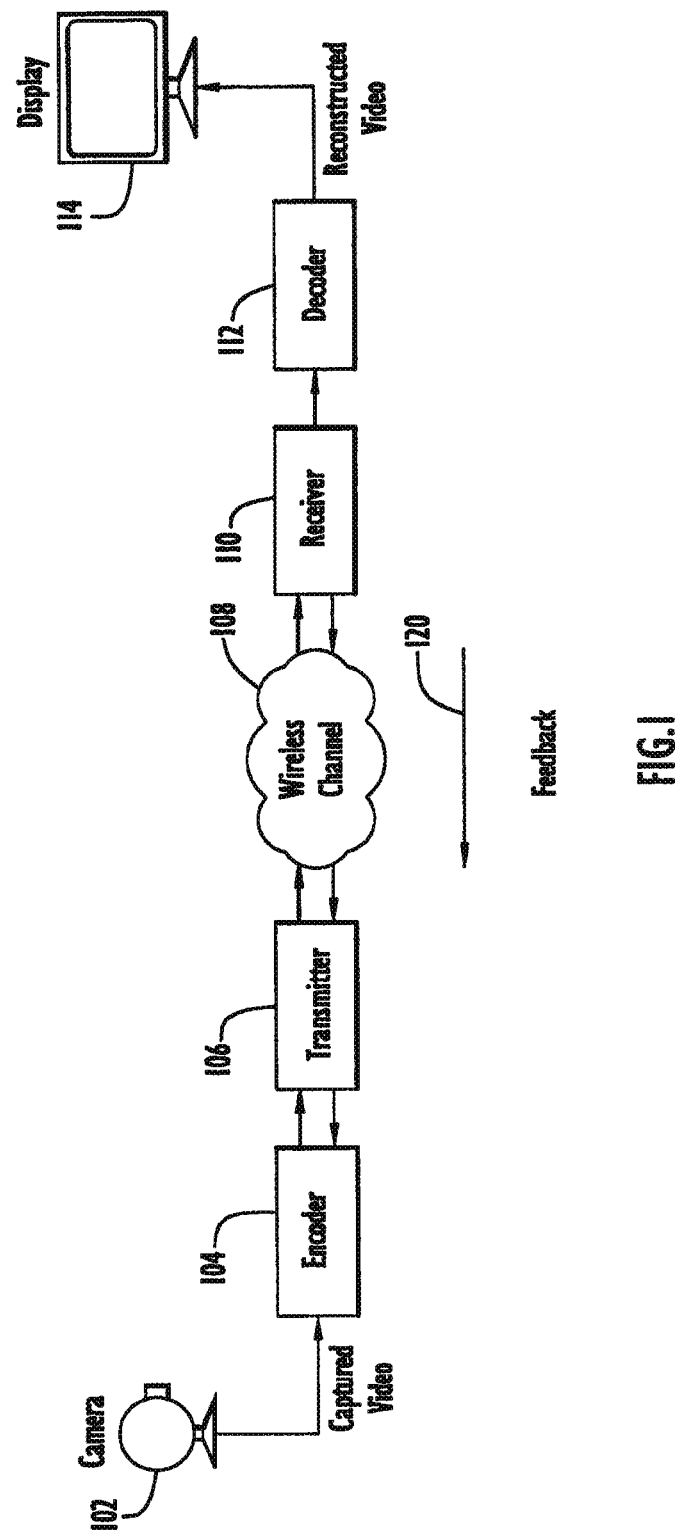
FIG. 1 illustrates a block diagram of exemplary components in an exemplary video transmission system consistent with the disclose embodiments.

FIG. 1 illustrates a block diagram of exemplary components in an exemplary video transmission system consistent with the disclose embodiments. The video camera 102 may capture video frames at a certain frame rate (e.g., 25 frames/second) and video data reflective of the captured video frames may be transmitted to the encoder 104. The encoder 104 may then encode the received video frames, i.e. the video data. In some embodiments, the camera 102 is not part of the system, and the encoder 104 may receive video data or video frames from one or more sources.

The video encoder 104 may be a block-based hybrid video-coding structure (e.g., MPEG-X, H.26X) that uses, for example, motion compensated prediction (MCP) and transform coding (e.g., discrete cosine transform, DCT). The encoded video may then be sent over a medium, such as the wireless channel 108, using transmitter 106. At the receiver side, there may be multiple receivers, and FIG. 1 illustrates only one of them in the exemplary system.

Once the receiver 110 receives video packets, the receiver may produce an acknowledgement (such as the feedback 120) and may send the acknowledgment over, for example, a wireless feedback channel to the transmitter 106. There may be one acknowledgement per packet, but the form and format of acknowledgements may vary. In one embodiment, the feedback information in the feedback 120 relates to the receiving status of one or more of the transmitted or received packets and may be indicative of packets not received correctly. For example, the feedback 120 may inform the transmitter 106 or the encoder 104 whether a transmitted video packet was successfully received or unsuccessfully received at the receiver 110. The video packet may be decoded by decoder 112 and reconstructed video, such as a reproduction (sometimes with some data loss due to the compression and decompression or encoding or decoding) of the video frames, may be provided to and presented on display 114. Although shown separately, encoder 104 and transmitter 106 may be integrally formed and function as a single component. Likewise, receiver 110 and decoder 112 may also be integrally formed and function as a single component. In addition, one or both of the transmitter 106 and the receiver 110 may be transceivers that have offers both transmitting and receiving functions.

In one embodiment, the transmitting end, such as the transmitter 106, the encoder 104, or a processor may examine error indications regarding the at least two receivers based on the feedback information received from the one or more receivers. The transmitting end, such as the transmitter 106, the encoder 104, or a processor may determine how to address the problem of having lost packet(s) and/or how to encode the next video frame. For example, different error-correction policies may be implemented depending on the variation in the error indications among the multiple receivers, and the implemented error-correction policy may include transmitting or retransmitting at least one packet using a coding scheme different from the scheme used in encoding the packets already transmitted.

As another example, in order to avoid mismatch in motion compensation prediction (MCP), lost slices may be concealed in the same way at both the encoder 104 and the decoder 112 and the concealed version of the video frame may be used for MCP. As will be appreciated by those skilled in the art, systems and methods consistent with the disclosed embodiments may rely on the feedback information from the receiver 110 to adjust the encoding scheme at the encoder 104 for better "synchronization" (or matching) between the encoder 104 and decoder 112, based on considerations such as channel quality, channel conditions, the decoder 112 or the receiving end's ability in processing the transmitted packets.

As an exemplary embodiment, the wireless channel may be a wireless 4-point-to-1-point or a wireless client-server arrangement, which may have four receiving devices and 1 transmitting device. Various wireless transmission schemes, such as Wireless Fidelity (WiFi), Bluetooth (BT), Ultra Wide Band (UWB), etc., can be employed. Proprietary wireless schemes or wired infrastructures may also be used. In various embodiments, the receivers can receive the transmitted packets and return acknowledgements (ACKs) or negative acknowledgements (NACKs) with respect to received packets.

In various embodiments, a video frame may be divided into macroblocks (MBs), and how a macroblock is encoded (INTRA-, INTER- or SKIP-mode) may be decided by coding control. Several macroblocks may form a slice, which has a fixed or variable size and can be decoded independently from other slices in the same video frame. Accordingly, the negative effect of erroneous bits in a compressed video stream on the reconstructed video quality may be minimized or reduced. The transmitter 106 may put the encoded video stream into fixed-size or variable-size video packets (e.g., one slice may be put into one packet) and may send them over the wireless channel 108 to the receiver 110. The receiver 110 may be any device that can receive the encoded video stream, such as a computer, telephone, PDA, and other devices. A (wireless) modem in the receiver 110 may be configured to return the feedback 120.

While transmitting and displaying the decoded data in real-time or nearly real-time is illustrated in the exemplary embodiments, those skilled in the art may also implement systems or methods that store the decoded data in a buffer or other memory or storage devices for playback, either within a relatively short or after a long period of time.

Figure 2:
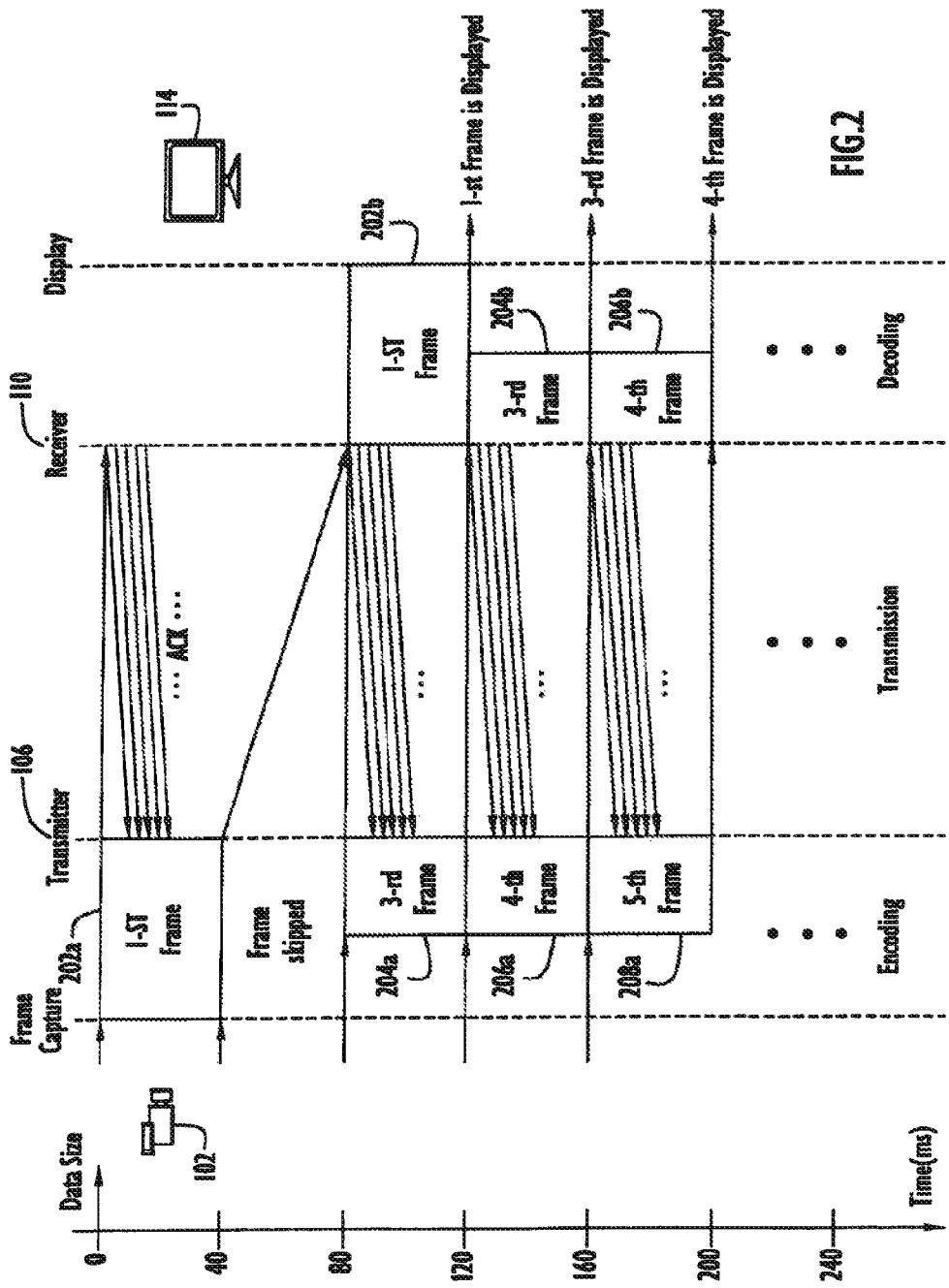
FIG. 2 illustrates an exemplary timing scheme for encoding, transmitting, and decoding video frames consistent with one embodiment.

FIG. 2 illustrates an exemplary timing scheme for encoding, transmitting, and decoding video frames in one embodiment. In one embodiment, a first captured frame 202a may be encoded independently as an I-frame, and the other frames may be encoded depending on the previous frame as P-frames. For example, a compressed video frame may be put into several fixed-size or variable-size video packets, and the packets may be sent over the wireless channel 108 to the receiver 110. Because the compression efficiency of encoding an I-frame may be significantly lower than encoding a P-frame, a doubled-bit budget may be used for encoding an I-frame in some embodiments to keep the quality consistent. This means two time intervals on the channel may be used for transmitting an I-frame. To meet the real-time constraint, the captured video frame after an I-frame (e.g., the second captured frame) may be skipped, and the bit budget (time interval) for this frame may be used for the I-frame. Then, the next captured frame may be encoded using the I-frame as the reference frame and may be sent out immediately after the I-frame, e.g., the 3rd frame 204*a*. After that, frames may be transmitted in the proper order, such as 206*a*, 208*a*, and so on. These frames may then be decoded on the receiver side as, correspondingly, 202*b*, 204*b* (for the 3rd frame), 206*b*, and so on.

The disclosed embodiments may provide error resilience and/or error recovery. As an example, a block-based hybrid video codec with slice structure may be used. In one embodiment, the video codec that may be used is based on the well-known block-based hybrid video coding structure (MPEG-X, H.26×), which uses motion compensated prediction (MCP) and discrete cosine transform (DCT) coding.

Figure 3:
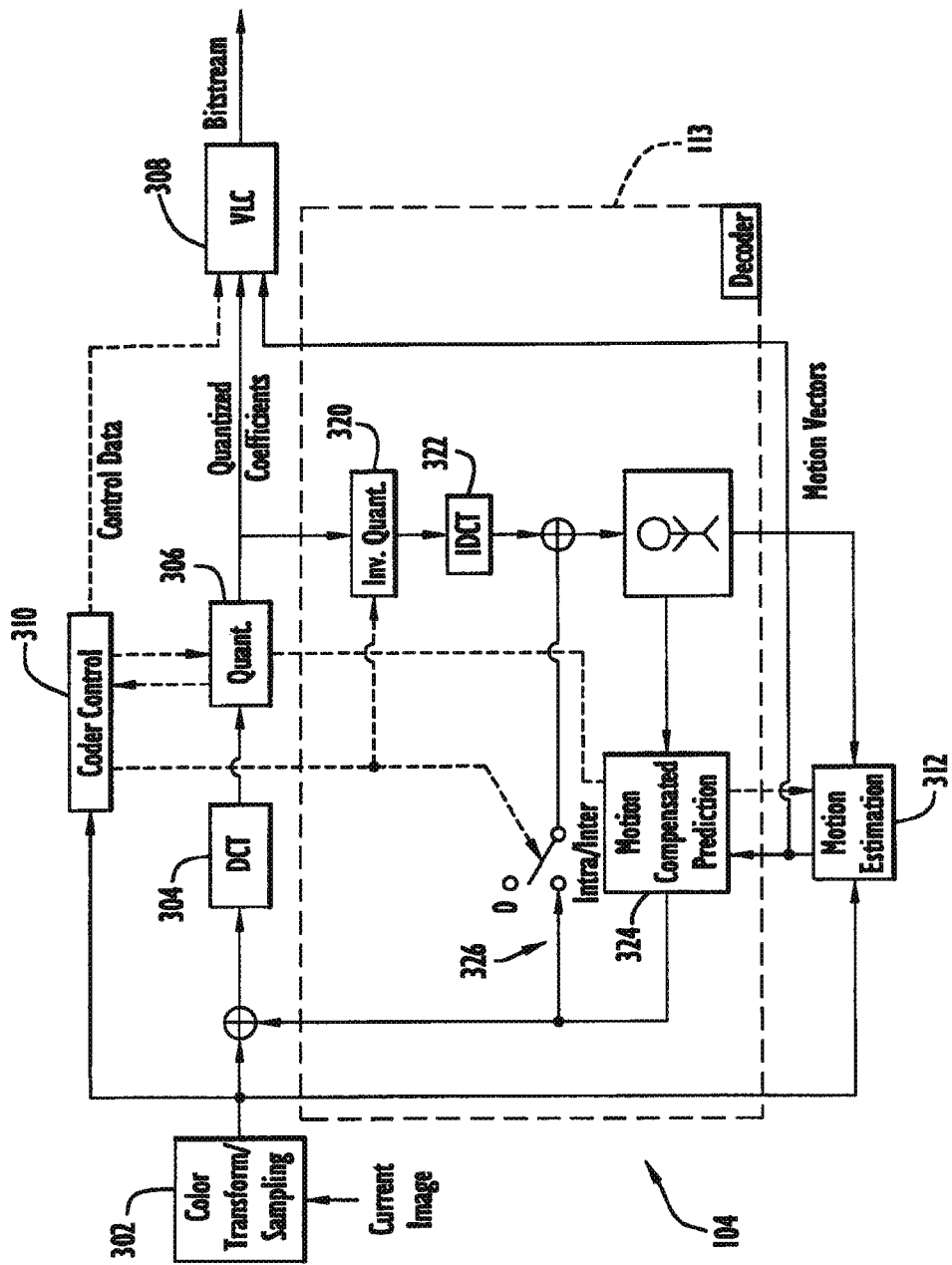
FIG. 3 illustrates a block diagram of an exemplary, block-based hybrid video encoder with embedded decoder consistent with one embodiment.

FIG. 3 illustrates a block diagram of an exemplary, block-based hybrid video encoder with embedded decoder consistent with one embodiment. Referring to FIG. 3, the encoder 104, with embedded decoder 113 (which has functionality similar to that of decoder 112), may include a color transform or sampling module 302, a DCT module 304, that may be connected to quantizer module 306, which generates quantized coefficients that are passed to variable length coding (VLC) module 308. As shown further, coder control 310 may be in communication with quantizer 306. The embedded decoder 113 may include an inverse quantizer 320, an inverse DCT 322, and a motion compensated prediction module 324. An INTRA/INTER coding switch 326, controlled by coder control 310, may be used to select independent video frame encoding (INTRA) or encoding using motion compensated prediction (INTER). Motion estimation module 312 may provide input to the motion compensated prediction module 324 and is also in communication with coder control 310.

In one embodiment, each captured video frame from the video camera 102 may be divided into macroblocks (MBs) of a fixed size, e.g. 16 times 16 pixels, and each macroblock may be either encoded independently (INTRA-mode), or predicted from a previously-coded reference frame using motion estimation (INTER-mode), or skipped (SKIP-mode). As noted, the first captured video frame 202*a* may be encoded using the INTRA-mode (I-frame), and the macroblocks in the following frames (P-frames) may be encoded in either INTRA-, INTER-, or SKIP-mode, depending on which encoding mode is more efficient (or most appropriate in view of the prevailing circumstances). This mode decision may be made by the coder control 310, and is discussed more fully later herein.

A number of macroblocks form a slice and several slices form a video frame. In one embodiment, each slice in a video frame may be decoded independently from other slices in the same video frame. In exemplary embodiments, each slice may have the same size and one slice may be encapsulated into one video packet. One reason why a slice structure is used for error-resilient video coding is to stop dependencies between different parts of a video frame such that losing one part (one slice) of the frame does not affect other parts (other slices) of the same frame. If this slice structure is not employed and, instead, one video frame is placed into one video packet, then even only one single bit error in the channel 108 might affect the whole video frame. Therefore, the smaller a slice is, the more resilient the whole system is against transmission errors. However, encoding a video frame into slices will cause more overhead and limits the use of dependencies among slices and therefore reduces the compression efficiency. Moreover, the smaller a slice is, the less efficient the compression will be. Accordingly, the size of the slice may be adapted to the channel characteristics to achieve the best overall performance. For instance, the optimum size of a slice may be a function of the channel quality and may be adapted as a function of the observed packet error rate. In one embodiment, a fixed packet or slice size may also be employed.

The disclosed embodiments may make mode decisions based on concealed reference frame. As an illustrative example, the macroblocks in the P-frames can be encoded either in INTRA-, INTER-, or SKIP-mode, depending on which mode is more efficient. A heuristic mode decision process may be performed by the coder control 310 that operates as follows. In one embodiment, to decide which mode to use to encode a given macroblock, the coder control 310 first checks the sum of absolute differences (SAD) between the macroblock to be encoded and the macroblock at the same position in the previous frame. If, for example, the difference is below a certain threshold, the macroblock may be skipped and the decoder may copy the macroblock from the previous frame. Otherwise, for example, motion estimation may be performed and the difference (SAD) between the macroblock to be encoded and the best match found in the previous frame may be calculated. In one embodiment, if this difference (plus a certain offset) is smaller than the deviation-of-mean of the macroblock, the macroblock may be encoded in INTER-mode. Otherwise, the macroblock may be encoded in INTRA-mode. The mode decision is signaled explicitly in the bitstream transmitted from the encoder 104 or the transmitter 106.

Figure 4:
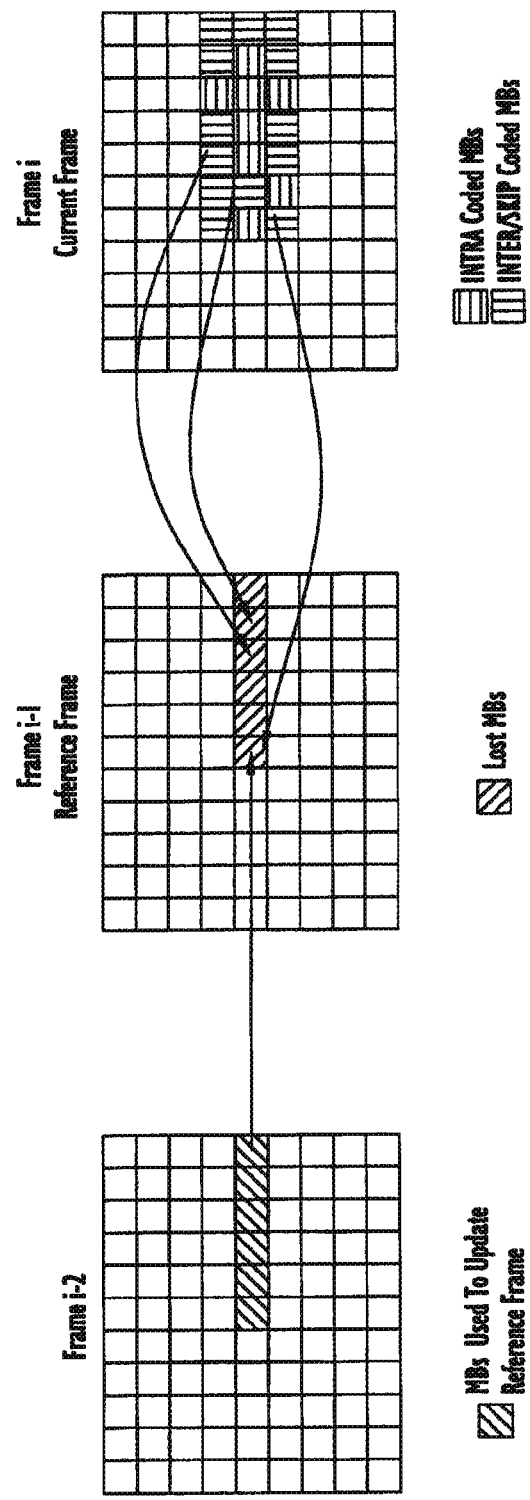
FIG. 4 illustrates an exemplary encoder-side error-concealment consistent with one embodiment.

As only the concealed version of the reference frame is available at the decoder 112 side, the motion estimation for mode decision may be performed at the encoder 104 based on the concealed reference frame to avoid mismatch in the motion compensation prediction process. This error concealment process is known as Error Resilient Motion Estimation (ERME). FIG. 4 illustrates an exemplary encoder-side error-concealment known as Multiframe Motion Compensated Prediction (MFMCP) consistent with one embodiment. As illustrated in FIG. 4, when a video packet in frame i-1 (the reference frame) is lost, the lost slice can be concealed by "borrowing" from an earlier frame, such as frame i-2. In one embodiment, the lost slice may be concealed by "borrowing" from frame i-n, where n may be a threshold value for available reference frames. In another embodiment, a good match may not be found for a lost slice in frame i-1, and therefore frames i-2 to i-n may be searched for a match so that the lost slice may be concealed. The frame i is then encoded using normal motion compensated prediction (MCP) based on the concealed version of frame i-1. In one embodiment, if the error concealment is successful, most of the macroblocks in frame i can find a suitable reference in frame i-1. In another embodiment, if the concealment is not satisfactory, motion compensated may will not perform well and most of the macroblocks in the affected area may be encoded in INTRA-mode.

The disclosed embodiments may provide macroblock-level rate control. For example, communication channels have a limit on the number of bits that can be transmitted per second and this bit rate limit is typically fixed in a system consistent with one embodiment. However, a basic block-based hybrid encoder may generate a variable number of bits for each encoded frame. That is, motion compensated prediction works better for some frames thereby generating a smaller number of bits as compared to other frames. Therefore, in one embodiment, rate control may be performed in the encoder 104 to generate an encoded stream with a constant bit rate (slightly) below the channel limit.

The accuracy of the rate control can have a significant impact on system performance. The more accurate the rate control is, the more efficiently the available channel bit rate will be used, and therefore the better the reconstructed video quality will be. Therefore, in one embodiment, macroblock-level rate control may be used in the system in order to achieve a high accuracy.

One embodiment of the macroblock-level rate control works as follows. The encoder 104 may monitor the number of bits used for the current frame while encoding macroblock by macroblock. If the number of bits is above a threshold, the encoder may increase the quantization parameter, which leads to a coarser quantization for the next macroblock and the overall bit rate of the current frame will decrease. If the number of bits is below a threshold, the encoder may decrease the quantization parameter, leading to a finer quantization for the next macroblock and an increased overall bit rate for the current frame.

In an actual implementation, rate control may never exactly match the target bit budget. Hence, in one embodiment, the target bit rate may be selected slightly lower than the available bit rate provided by the digital transmission system.

The disclosed embodiments may provide channel adaptive retransmission. It is not uncommon for video packets to be corrupted or lost during transmission over the wireless channel 108 to the receiver 110. Consistent with various embodiments, the receiver 110 may send immediate feedback information 120 for each video packet over the feedback channel to the transmitter 106, informing the transmitter 106 if a given packet is successfully received or corrupted. For example, a positive ACK can be returned indicating successful receipt/decoding, a negative ACK can be returned indicating unsuccessful receipt/decoding, or if no ACK is returned at all, then the encoder may deem that the packet was never received and treats that packet like a negatively ACK'ed packet. Thus, based on the feedback information 120 from the receiver 110, the transmitter 106 may be provided information about the status of each video packet and retransmission of the lost packet(s) may be considered.

Specifically, in one embodiment, a channel adaptive retransmission scheme may be employed to decide whether the transmitter 106 should retransmit the lost packets, and how the total transmission bit budget is split into bit budget for source coding and bit budget for retransmission of the lost packets.

One embodiment of the retransmission scheme works as follows. All the packets of a video frame may be transmitted once in a first round of transmission. If the total available transmission bit rate is higher than the source coding bit rate, transmitter 106 can retransmit the packets that are lost in the first round. If not all the packets are received successfully after the second round and there is still bit budget available in the timeslot/frame for retransmission, the packets that are still lost may be transmitted again in a third round. In one embodiment, this retransmission process ends when the available transmission bit rate for a given frame is used up or all the packets are successfully received by the receiver 110.

Figure 5:
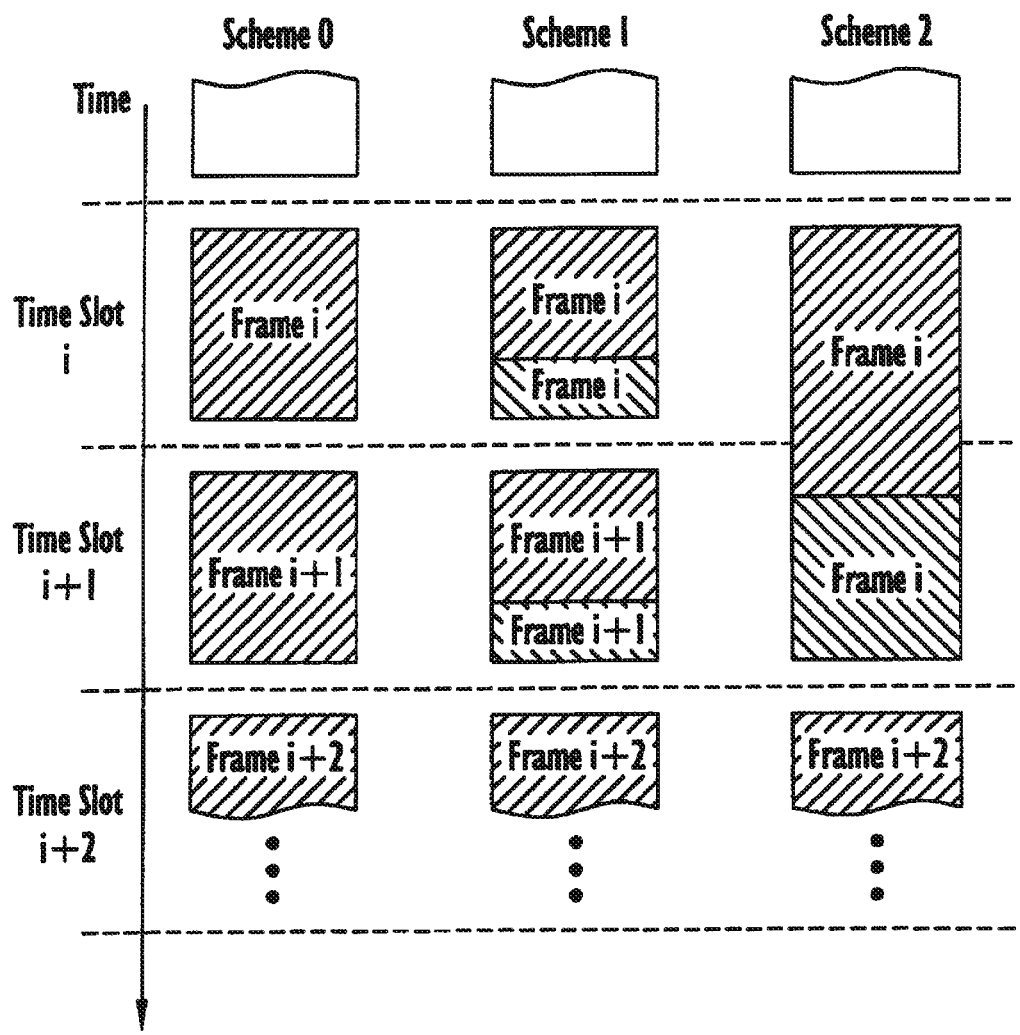
FIG. 5 illustrates several exemplary retransmission schemes that may be employed consistent with various embodiments.
Figure 6:
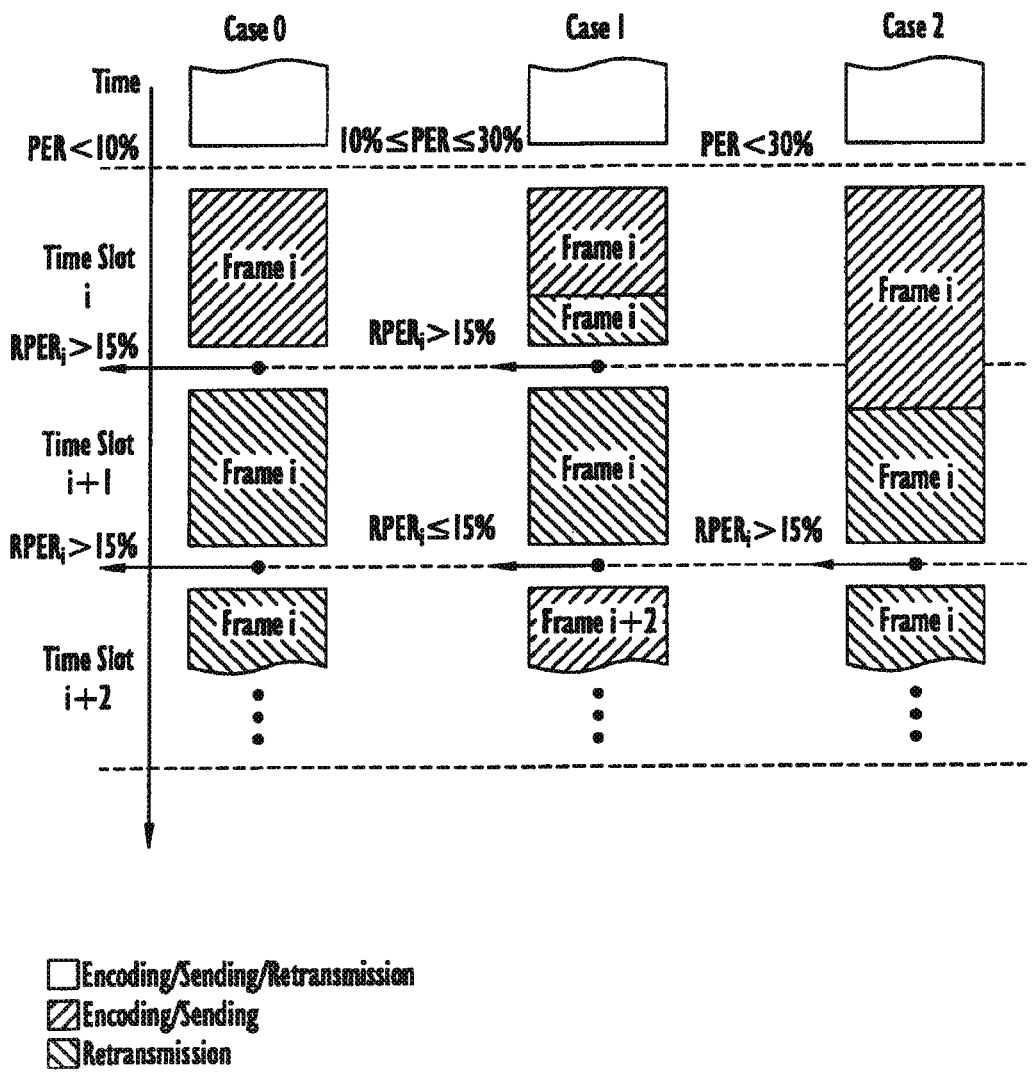
FIG. 6 illustrates several other exemplary retransmission schemes that may be employed consistent with various embodiments.

In one embodiment, the channel adaptive retransmission process may comprise four different retransmission schemes, which are disclosed in detail in Section 3.1 to Section 3.4 below and with reference to FIGS. 5 and 6. Further, a state diagram, shown in FIG. 7, describes how the retransmission schemes are combined to form an example the channel adaptive retransmission. One embodiment describing this aspect is included in Section 3.5.

In one embodiment, which can be named as scheme 0 and an illustrative example, before encoding a new video frame, a system, method or process first may check the packet error rate (PER) in the wireless channel 108 during the transmission of the previous frame and may use the PER as the estimate of the channel condition during the transmission of the new frame. If the PER of the previous frame is below a certain threshold (e.g. 10%) (established by the feedback received from the receiver 110), the system considers that the wireless channel 108 will be in "good" condition during the transmission of the current frame and therefore no retransmission of lost video packets of the current frame is considered, as the synchronized error concealment (disclosed later herein) at both the encoder and decoder should provide satisfactory reconstructed picture quality. The total available transmission bit rate is, consequently, used for source coding and each video packet will be transmitted only once, as shown in FIG. 5, scheme 0.

In another embodiment, which can be named as scheme 1 and an illustrative example, for retransmission scheme 1 the system also may use the PER of the previous frame as the estimate of the channel condition for the current frame. If the packet error rate of the previous frame is, for instance, between 10% and 30%, the system may consider that the wireless channel will be in "medium" condition for the current frame. In this case, only using synchronized error concealment will likely not provide satisfactory reconstructed picture quality and, therefore, the retransmission of lost packets of the current frame is considered. In one embodiment, to save some bit rate for the retransmission, the source coding bit rate is reduced by using coarser quantization for encoding the current frame. Thus, for example, as shown in FIG. 5, scheme 1, in, e.g., Time Slot i, portions of Frame i are retransmitted during the same Time Slot i. The retransmission of the lost video packets may reduce the residual packet error rate (RPER) (i.e., the PER subsequent to retransmission) of the current frame and may increase the reconstructed picture quality. This type of retransmission is called spatial retransmission. However, in the error-free case, those skilled in the art will appreciate that this will result in a decreased reconstructed picture quality compared to scheme 0, where the total available transmission bit rate is used for source coding.

In one embodiment, the bit budget reserved for source coding is computed depending on the packet error rate of the previous frame as follows:

$$R_S^i = \frac{R_C^i}{1 + PER_{i-1} + (PER_{i-1})^2 + \ldots + (PER_{i-1})^n},$$

where $R_S^i$ denotes the bit budget for encoding frame i, $R_C^i$ denotes the total available bit rate for transmitting frame i, $PER_{i-1}$ denotes the packet error rate in the wireless channel during the transmission of frame i-1 and n is the expected integer number of retransmission rounds for frame i so that the residual packet error rate does not exceed a certain threshold (e.g. 5%), which is computed by solving:

$(PER_{i-1})^n = 0.05(\text{threshold})$

As an example, assume that the expected packet error rate during time slot i is 10% (PER=0.1). Further assume that the rate budget for time slot i $R_C^i$ is 100 kbit. If we plan for only one retransmission (n=1) this means that 10% of the packets transmitted in the first round will have to be retransmitted. We can write this as $R_S^i + PER*R_S^i = R_C^i$. The rate available for source coding becomes $R_S^i = 90.91$ kbit and the rate reserved for retransmissions becomes $R_C^i - R_S^i = 9.09$ kbit. The expected residual packet loss rate becomes $R_S^i*PER^2 = 1\%$. If we plan for two retransmissions we have to solve $R_S^i + PER*R_S^i + PER^2*R_S^i = R_C^i$. The source rate $R_S^i$ becomes $R^i_s$=90.09 kbit. The expected residual error rate now becomes $PER^3$=0.1% and so on and so forth.

In one embodiment, which can be named as scheme 2 and an illustrative example, if the wireless channel is in "bad" condition and the packet error rate of the previous frame is high (e.g., >30%), the bit budget reserved for source coding using scheme 1 will be too low to get a satisfactory reconstructed picture quality. Therefore, in retransmission scheme 2 (FIG. 5, scheme 2), for example, the frame after the current frame may be skipped and the total available bit rate for transmitting the current frame may be doubled. The doubled total available bit rate may be split into bit budget for source coding and retransmission budget. The bit budget reserved for source coding may be computed using (1) and (2), where $R^i_C$ is the doubled total available transmission bit rate. This type of retransmission is called temporal retransmission. In one embodiment, the resulting source coding budget should be larger than a certain minimum value to keep the distortion introduced by encoding limited to an acceptable extent. Depending on the actual packet error rate, the reconstructed quality of frame i in an error free channel condition could increase, decrease or remain unchanged compared to scheme 0. Because some frames are skipped in this scheme, the effective frame rate is reduced.

To summarize various embodiments, in scheme 0, no retransmission of the lost packets is considered and the total available bit rate is used for source coding. In scheme 1, the total available bit rate is split into bit budget for source coding and retransmission budget (by employing coarser quantization). This type of retransmission is called spatial retransmission. In scheme 2, the next frame (here frame i+1) is skipped and the total available bit rate is doubled. The doubled bit rate is then split into source coding budget and retransmission budget. This type of retransmission is called temporal retransmission.

In one embodiment, which can be named as scheme 3 and an illustrative example, if the residual packet error rate (RPER) of a current frame is still higher than a threshold amount after the total bit budget is used up, the system skips the following frames and uses the available bit rate for retransmission until the residual packet error rate (RPER) is below a certain threshold (e.g., 15%). This retransmission scheme is based on the RPER of the current frame and can be combined with embodiments of the schemes 0, 1 and 2, respectively, as shown in FIG. 6. For instance, in case 1, before encoding frame i, it may be determined that the wireless channel is in "medium" condition during the transmission of the previous frame and it is therefore decided to use retransmission scheme 1 for frame i. However, the actual channel condition during the transmission of frame i is much worse than expected and it is observed that after time slot i is used up, the RPER of frame i is still higher than 15%. Therefore, it is decided to use retransmission scheme 3, where frame i+1 is skipped and time slot i+1 is used for retransmitting still lost packets in frame i. After the retransmission in time slot i+1, the residual packet error rate of frame i is below 15% and no further frames will be skipped. Then, before encoding frame i+2, the proper retransmission scheme is selected for it depending on the PER of frame i.

Figure 7:
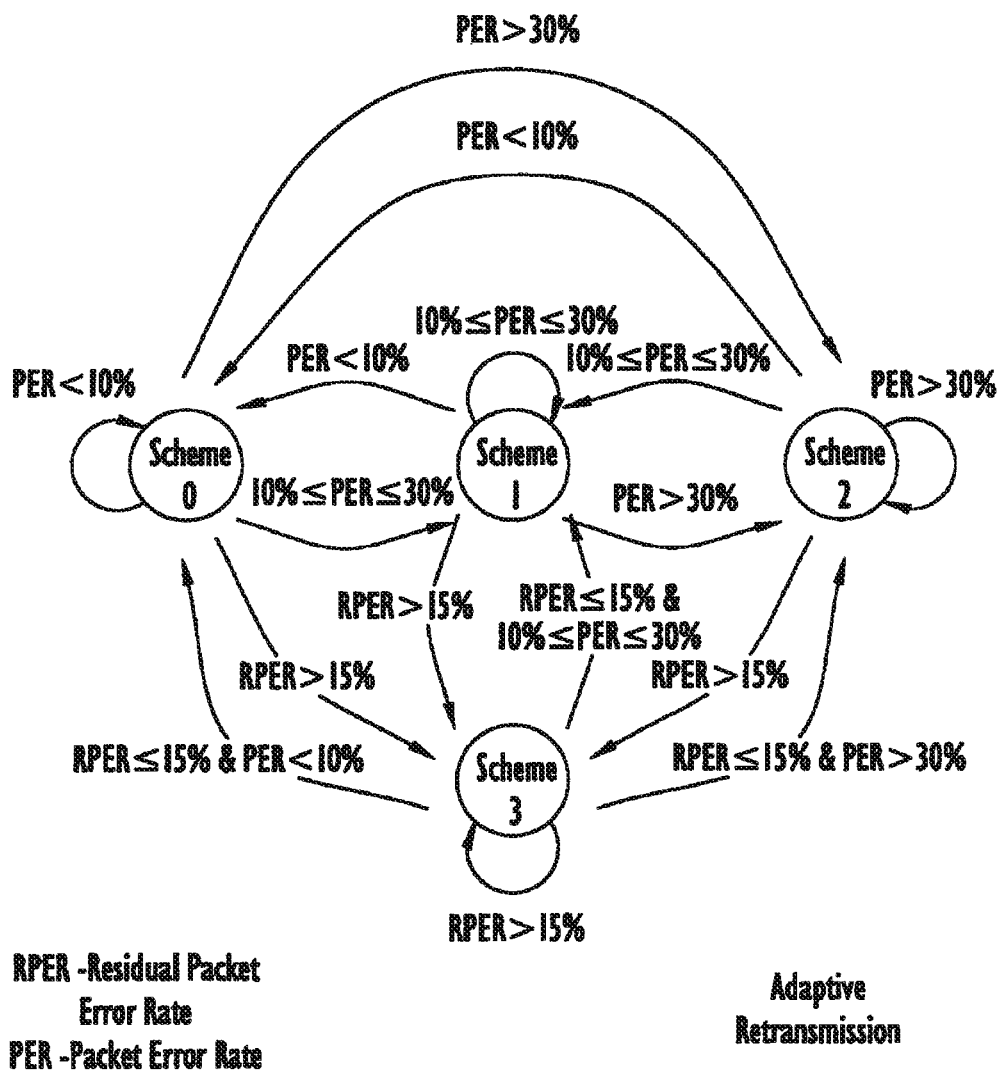
FIG. 7 illustrates a state diagram of an exemplary channel adaptive retransmission scheme consistent with various embodiments.

The disclosed embodiments may implement channel adaptive retransmission using one or more of various mechanisms. The state diagram depicted in FIG. 7 shows how the four retransmission schemes disclosed above are combined, and form the channel adaptive retransmission scheme in one embodiment. In one embodiment, before encoding a new video frame, scheme 0, 1 or 2 may be selected for this frame according to the current channel condition (i.e., estimated using the packet error rate during the transmission of the previous frame). After the total available bit rate for transmitting the current frame is used up, the residual packet error rate may be checked and it may be determined whether further retransmission of lost packets is necessary. If yes, the following frames may be skipped and the available bit rate may be used for the retransmission (scheme 3) until the RPER is below a threshold, for instance, 15%. If no further retransmission is necessary, the next frame may be encoded and transmitted according to the selected retransmission scheme for it.

Using scheme 3 increases the likelihood that the residual packet error rate of a frame is below a certain value so that the displayed frame has a satisfactory quality. This improves the system performance significantly in case, for example, the wireless channel 108 goes suddenly into very bad condition, for instance, the receiver 110 goes out of the receiving range. In this case, the user will have a still image with satisfactory quality until the channel recovers (e.g., the receiver returns into the receiving range). In one embodiment, the new video frame may be encoded (probably in INTRA mode) and transmitted to the receiver. How to encode is determined by the mode decision algorithm of the encoder. If, for example, the most recently displayed frame has a significant time distance to the current frame, the mode decision algorithm will pick INTRA mode for most of the macroblocks. If only few frames were dropped, the INTER mode will typically be selected.

Moreover, no increase in end-to-end delay is introduced by the instant retransmission scheme and therefore the video transmission system operates in real-time. For instance, if there is a move to coarser quantization to allow for retransmission of lost packets (scheme 1) only picture quality is decreased. If a frame is skipped in order to be able to perform many retransmissions (scheme 2,3) only frame rate is decreased.

As explained in one embodiment, the channel adaptive retransmission scheme may be used in the system to handle video packets that are lost in the wireless channel 108 during transmission. In one embodiment, all the packets of a video frame may be transmitted once in the first round of transmission. If the available transmission bit rate is higher than the encoding bit rate, retransmission of lost packets can occur in the first round. In one embodiment, if not all the packets are received successfully after the second round and there is still bit rate available for retransmission, the packets that are still lost can be transmitted again in the third round. In another embodiment, this retransmission process stops when the available transmission bit rate for this frame is used up or all the packets are successfully received by the receiver.

In one embodiment, in order to save some bit rate for retransmission, the system may either use coarser quantization for encoding the current frame or skip the next frame. The decision between these two possibilities may be made adaptively based on the channel status. Before encoding a new frame, the system may obtain the packet error rate in the channel during the transmission of the previous frame based on the feedback information from the receiver 110.

Those skilled in the art will appreciate that any other means by which an estimate of the current channel situation is made available to the sender may be implemented. Employing the observed loss rate for the previous time slot as the estimate of the loss rate for the current time slot, as disclosed herein, is only one option. The more accurate the channel estimation for time slot i is, the better the performance of the system is.

PER and RPER may be determined by feedback received from the receiver 110 or the decoder 112. In one embodiment, the feedback may be immediate in that the positive or negative acknowledgments for packets/slices are received before these slices are referenced for motion compensated prediction during encoding of the current frame. In other words, in one embodiment, the feedback for particular slices is received before the corresponding area in the previous frame is referenced for motion compensated prediction.

Any type of feedback arriving early enough to conceal those parts of the previous frame before they are used for motion compensated prediction of macroblocks in the current frame is considered to be immediate feedback in the context one embodiment. In one embodiment, to realize such immediate feedback, every packet can be acknowledged individually or several feedback messages may be combined into one return packet. It is noted that immediate feedback for slices in a lower part of a previous frame might arrive after the encoding of the current frame has already started, because they will only be referenced by macroblocks in the lower part of the current frame.

If there are still some video packets lost after the retransmission, lost slices (corresponding to the lost packets) may be concealed at the decoder. In addition, and in one embodiment, an identical error concealment may be performed at the encoder. FIG. 4 depicts how such error concealment may be implemented. By way of example, the concealed reference frame may be stored, for instance, in a reference frame buffer, both at the encoder and at the decoder to avoid mismatch in the motion compensated prediction.

Figure 8:
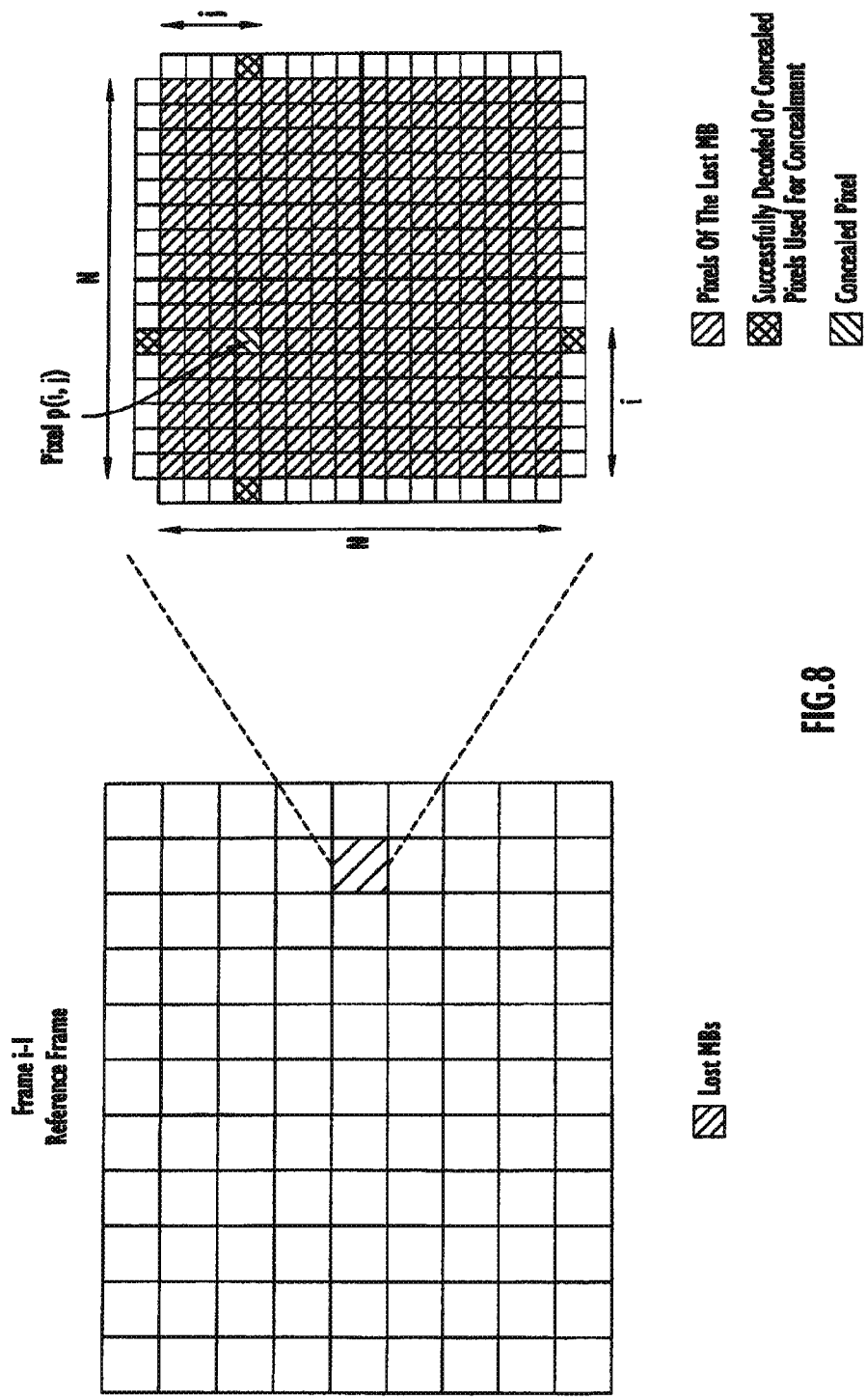
FIG. 8 illustrates an exemplary spatial interpolation of a lost macroblock consistent with various embodiments.

One spatial concealment scheme, described in S. Aign and K. Fazel, "Temporal and Spatial Error Concealment Techniques for Hierarchical MPEG-2 Video Codec," in *IEEE International Conference on communication*, vol. 3, pp. 1778-1783, 1995, that may be used in connection with a present embodiment interpolates pixels in a lost macroblock from pixels in the neighboring correctly received or concealed macroblocks. With reference to FIG. 8, for a macroblock size of N×N the interpolation may be performed as follows:

$$P(i,j) = \frac{1}{2} \left\{ \begin{array}{l} \left(1 - \frac{j}{N}\right)p(i,0) + \frac{j}{N}p(i,N+1) + \\ \left(1 - \frac{i}{N}\right)p(0,j) + \frac{i}{N}P(N+1,j) \end{array} \right\}$$

In case some of the neighboring macroblocks are missing, the interpolation is calculated only from the available macroblocks.

Figure 9:
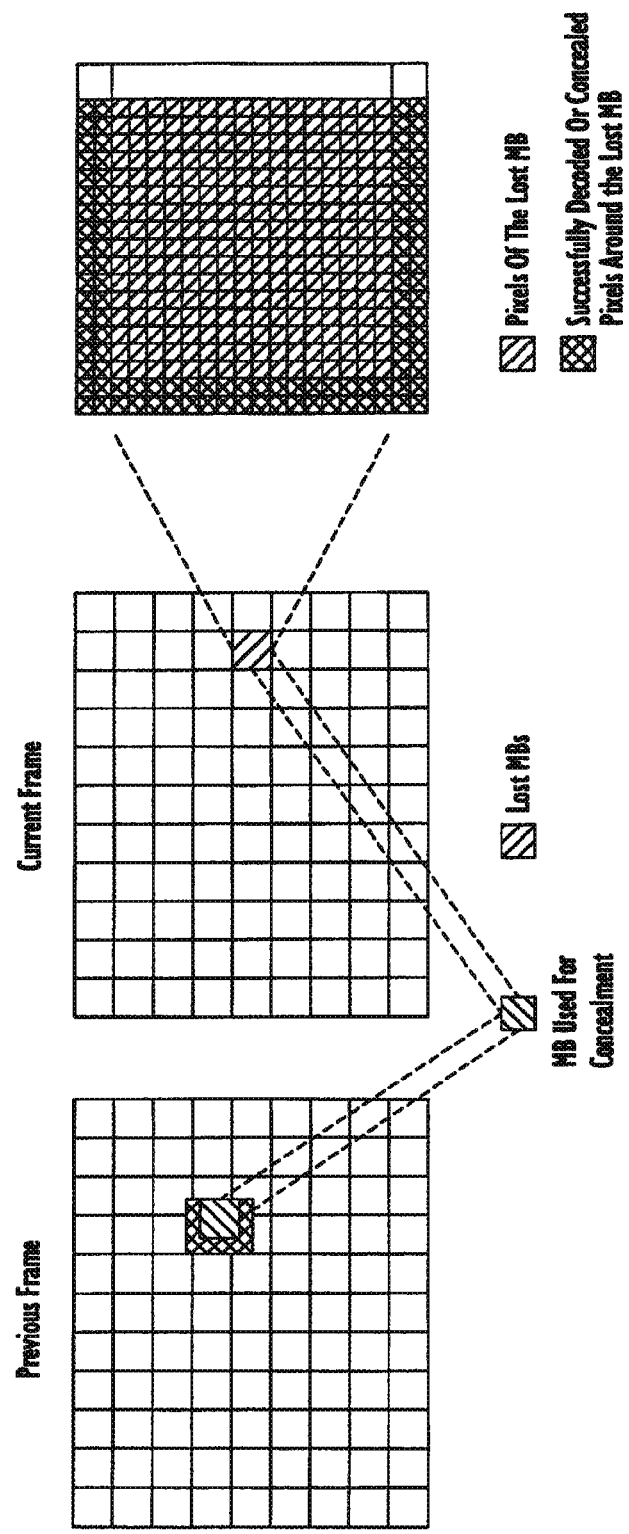
FIG. 9 illustrates an exemplary decoder motion-vector estimation (DMVE) for temporal error concealment consistent with various embodiments.

Decoder motion vector estimation (DMVE), as disclosed in J. Zhang, J. F. Arnold, and M. R. Frater, "A Cell-loss Concealment Technique for MPEG-2 Coded Video," *IEEE Trans. Circuits Syst. Video Technol.*, vol. 10, no. 4, pp. 659-665, June 2000 is a temporal concealment scheme that may be used in connection with the disclosed embodiments, where the lost macroblock may be replaced by the macroblock of the previous frame at the motion compensated position, as depicted in FIG. 9. The corresponding position in the previous frame is determined by checking a small number of candidate motion vectors:

Motion vector for the same macroblock in the previous picture;
Motion vectors associated with available neighboring macroblocks;
Zero motion vector.

Out of the set of candidate motion vectors, the one that leads to the smallest error for an eight-pixel wide image area around the macroblock to be concealed is selected for concealment.

Figure 10:
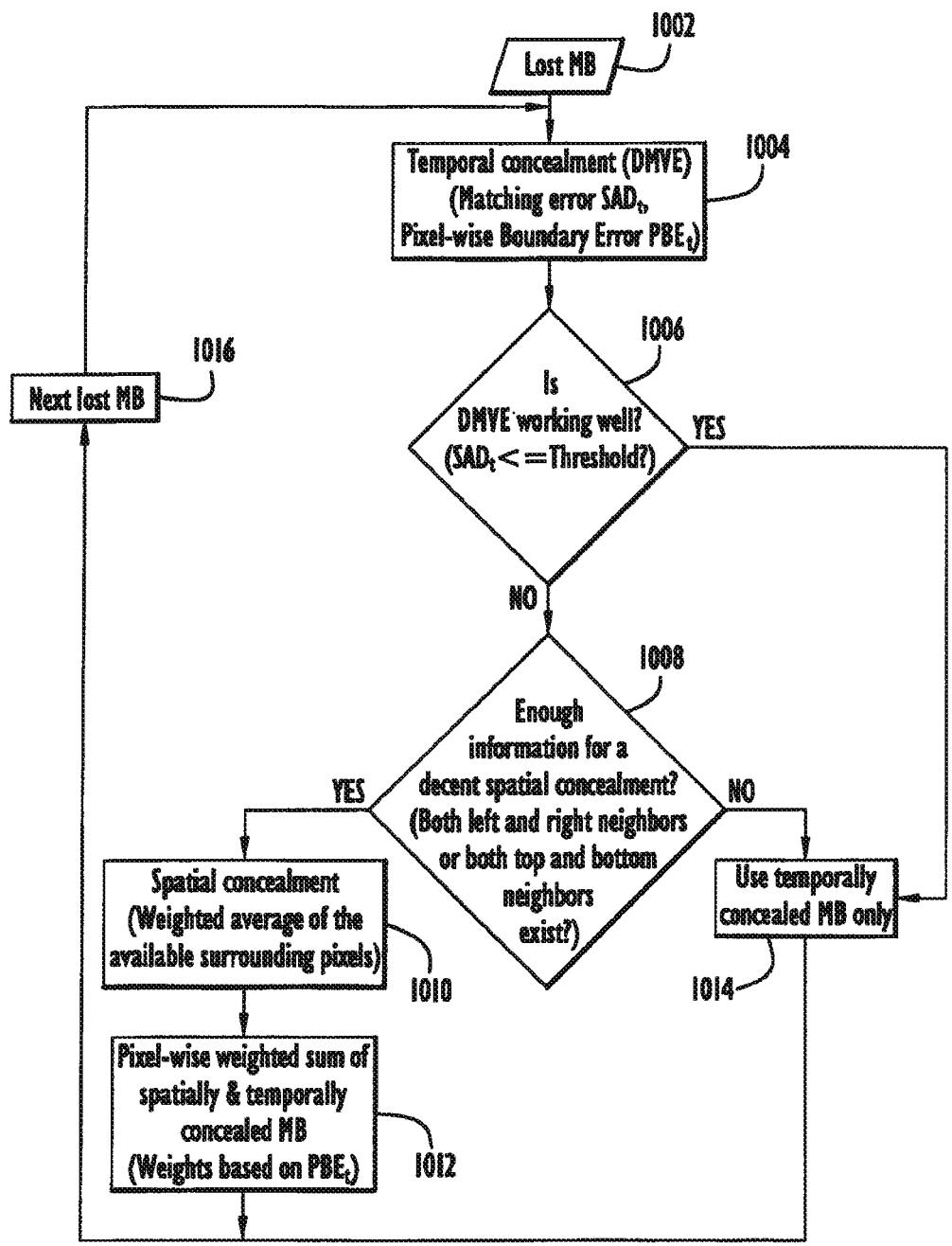
FIG. 10 shows a flow chart illustrating an example of performing combined spatial and temporal error concealment consistent with various embodiments.

Combined spatial and temporal concealment may be used in implementations of a present embodiment, where DMVE (temporal concealment) is combined with spatial interpolation. Embodiments of a process for such a combination is shown in FIG. 10. The error measure in DMVE may be used to evaluate the performance of DMVE and may be used as the weighting factor in the combination. More specifically, beginning with a given lost MB at step 1002, temporal concealment using DMVE may be performed at step 1004. Both matching error using SAD and pixel-wise boundary error (PBE) can be employed. In one embodiment, if it is determined that DMVE is working well (e.g., if SAD is less than or equal to a predetermined threshold) at step 1006, then the process moves to step 1014 at which error concealment using temporal concealment may be relied upon exclusively.

In another embodiment, if, on the other hand, at step 1006 it was determined that DMVE was not working well, then the process moves to step 1008 at which it is determined if there is sufficient information for spatial concealment. This determination can be made based on whether, e.g., both left and right neighbors, or both top and bottom neighbors, exist for a given MB. If there is insufficient information, then spatial error concealment cannot be performed and the process continues with temporal concealment at step 1014.

If it is determined that there is sufficient information for spatial error concealment at step 1008, then, for example, at step 1010 spatial error concealment may be performed using, e.g., a weighted average of the available surrounding pixels. Then, at step 1012, a pixel-wise weighted sum of a spatially and temporally concealed MB (with weights based on PBE) may be employed for the missing or lost MB. The next lost MB may be then considered for error concealment.

Those skilled in the art will appreciate that other error-concealment methods may be employed in connection with one embodiment and that the DMVE temporal concealment and spatial concealment methods disclosed above are to be considered exemplary and non-limiting.

Figure 11:
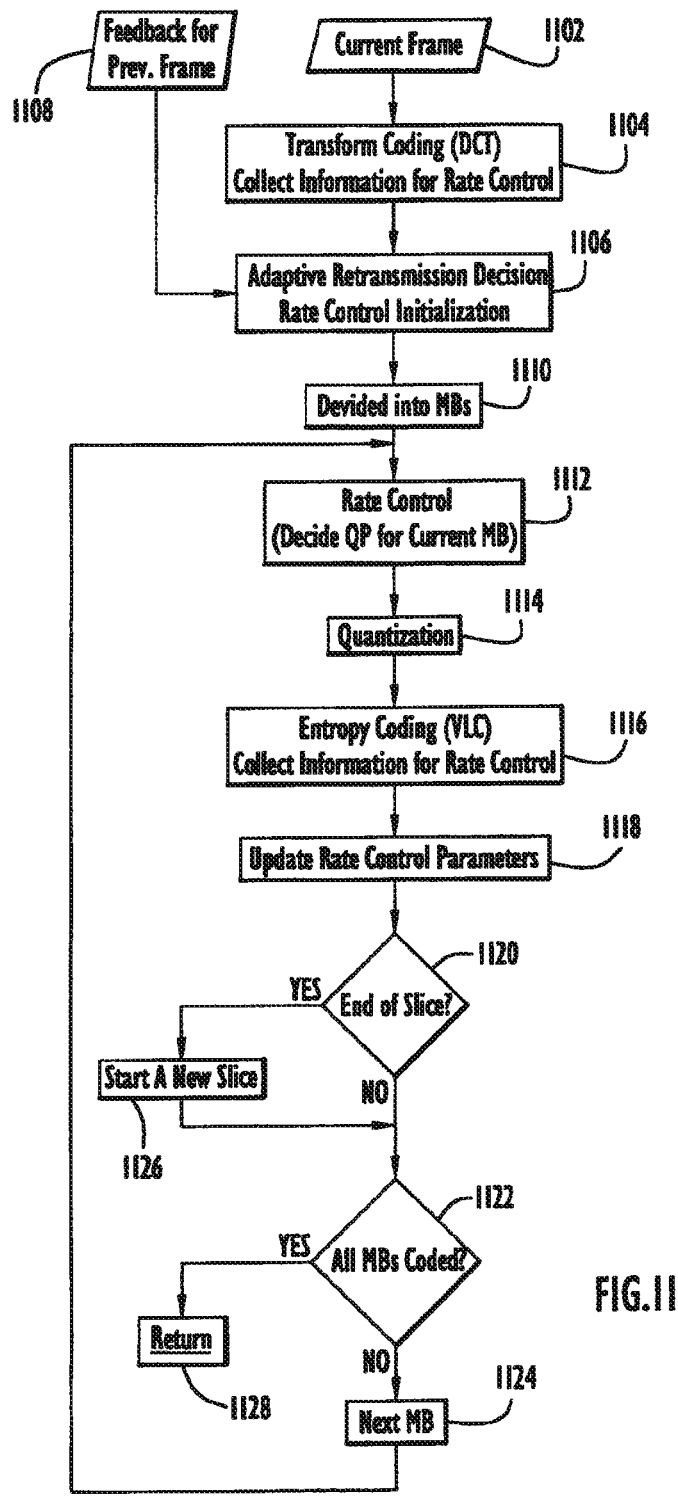
FIG. 11 shows a flow chart illustrating exemplary steps performed by an encoder when encoding an I-frame consistent with various embodiments.

FIG. 11 shows an exemplary series of steps for encoding an I-frame in one embodiment. As shown, at step 1102, data for the current frame may be captured. At step 1104, DCT transform coding may be performed and information for rate control may be collected. For example, it is determined how many of the coding coefficients are non-zero. Then, using the PER from the previous frame from step 1108, an adaptive retransmission decision is made at step 1106 along with rate control initialization. This step may establish the conditions for encoding the current frame.

The frame may then divided into macroblocks (MBs) at step 1110 and rate control parameters may be set at step 1112. At step 1114, quantization may be performed and, at step 1116, variable length coding (VLC) may be employed. Then, at step 1118, the rate control parameters may be updated. Step 1120 determines whether the end of slice has just been encoded. If no, then step 1122 determines whether all MBs have been encoded. If all MBs have been encoded, then the process returns at step 1128. If not all of the MBs have been encoded, then the next MB is processed as indicated by step 1124. If at step 1120, the end of a slice has occurred, then at step 1126 a new slice is begun. In this way, as shown in FIG. 11, all of the MBs/slices of a given frame may be INTRA coded and the rate parameters can be controlled consistent with the adaptive retransmission method disclosed above.

Figure 12A:
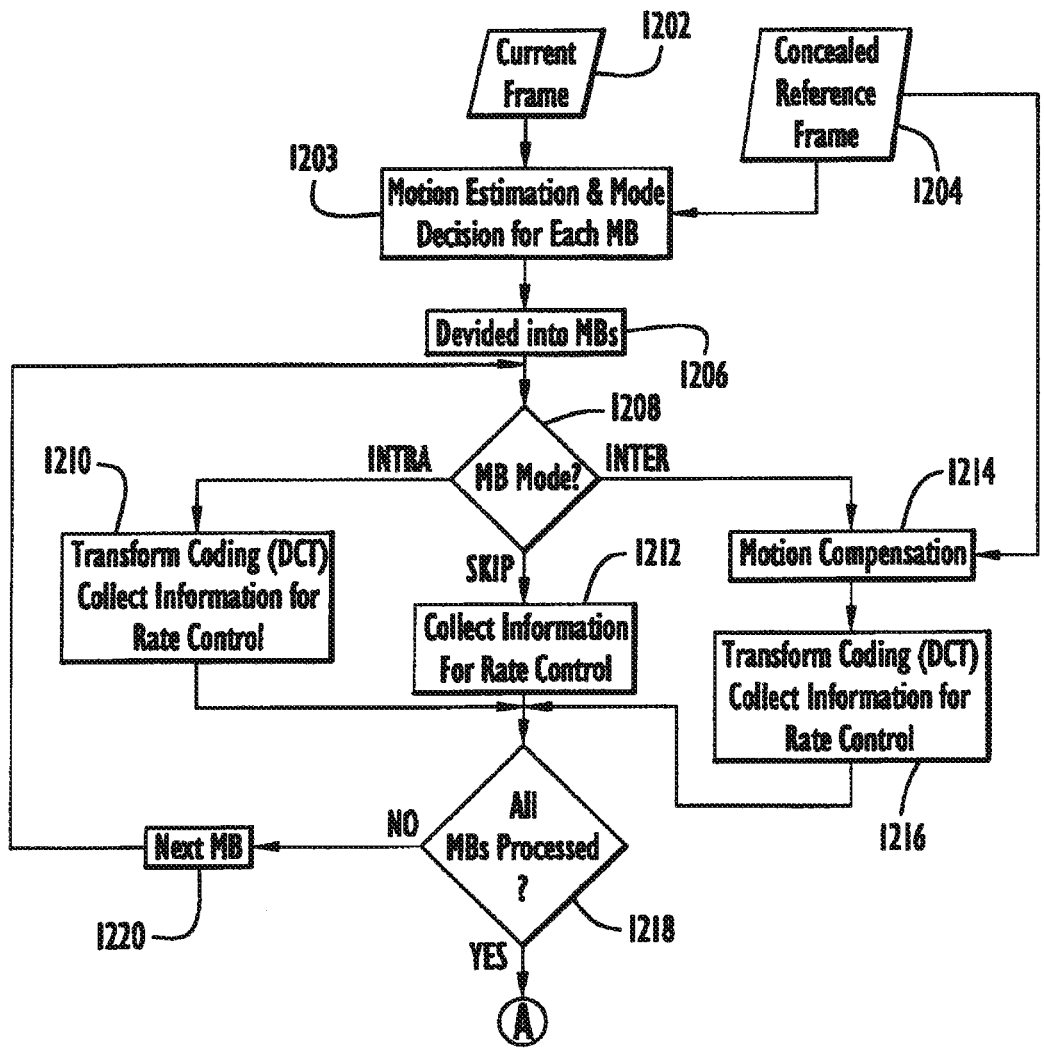
FIGS. 12A and 12B show a flow chart illustrating exemplary steps performed by an encoder when encoding a P-frame consistent with various embodiments.
Figure 12B:
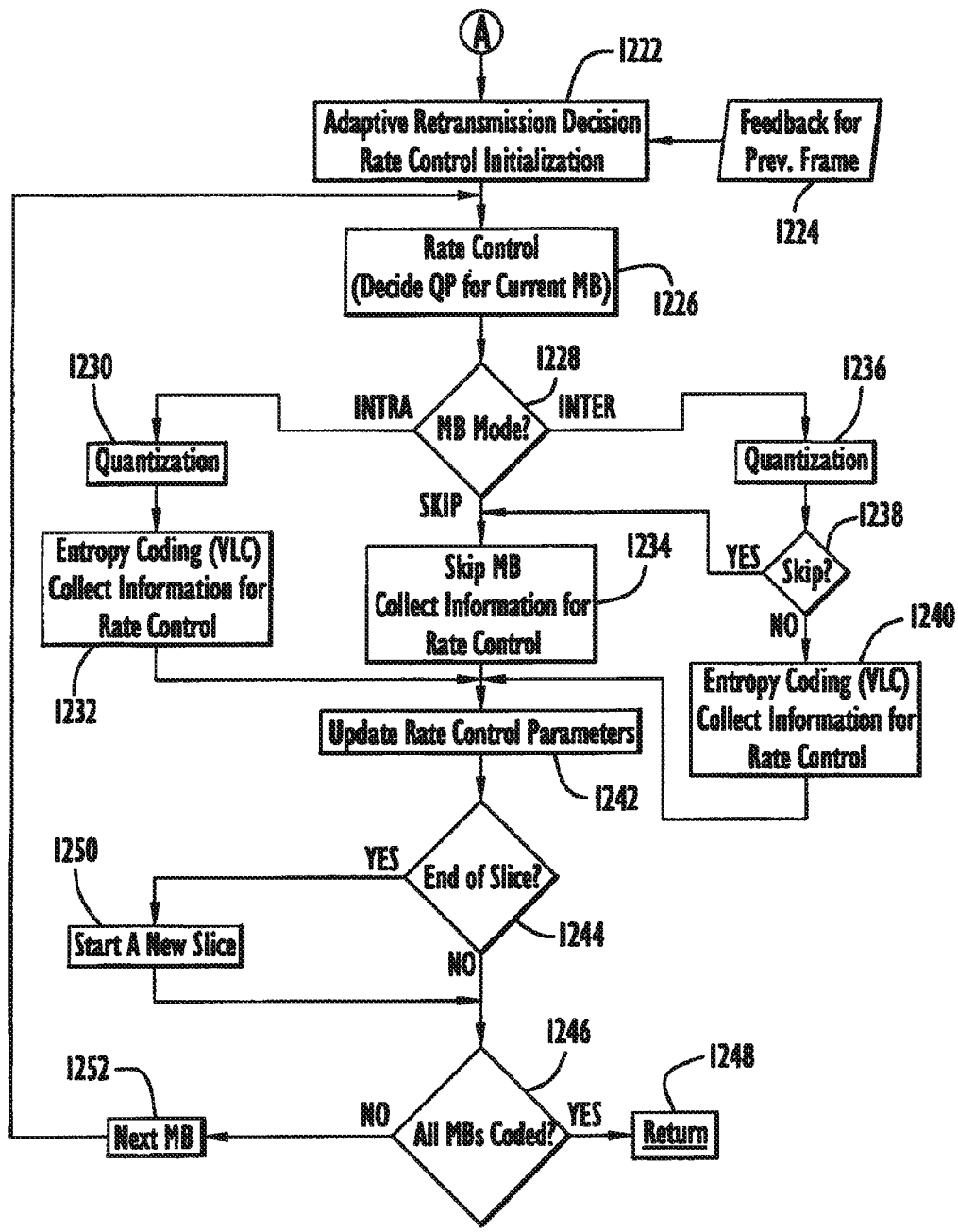

FIGS. 12A and 12B depict an exemplary series of steps for encoding a P-frame in one embodiment. In this case, the process begins at step 1202 where the image data for the current frame is obtained. At step 1204, data for a concealed reference frame may be provided so as to perform motion estimation and make a mode decision (INTRA, INTER, SKIP) for each MB, at step 1203. The frame may be divided into a plurality of macroblocks at step 1206. Step 1208 determines which mode is to be selected for each MB and the appropriate processing may be applied to that MB. More specifically, if the MB is to be INTRA coded, then DCT transform coding may be performed on the MB and rate control information may be collected (step 1210). If the MB is to be skipped, then only rate control information may be collected (step 1212). If the MB is to be INTER coded, then motion compensation may be performed (step 1214) and DCT transform coding may be performed on the MB and rate control information is collected (step 1216). Notably, for step 1214, the concealed reference frame (from step 1204) may be made available for motion compensation.

It is then determined whether all MBs have been processed at step 1218. If not, the next MB is selected as indicated at step 1220.

If all of the MBs have been processed, then at step 1222 an adaptive retransmission decision may be made based on feedback from the previous frame (step 1224), and rate control is initialized. With the foregoing information, rate control may be established at step 1226 and each MB is flagged for the appropriate processing (step 1228).

Specifically, if the MB is to be INTRA encoded, then at step 1230 quantization may be performed and at step 1232 VLC entropy coding may be performed and rate control information may be collected. If the MB is to be skipped, then, at step 1234, rate control information may be collected. If the MB is to be INTER encoded, then at step 1236 quantization may be performed, at step 1238 it is determined whether the MB is to be skipped, and, if not, VLC entropy encoding may be performed and rate control information may be collected. If it is determined that the MB is to be skipped at step 1238, then no VLC entropy coding may be performed, as shown.

Once the appropriate processing is completed for a given MB, the process continues with step 1242 where rate control parameters may be updated. It is then determined, at step 1244, whether an end of a slice has been detected. If yes, then a new slice may be started, as indicated by step 1250. If the end of a slice has not been detected, then it is determined at step 1246 whether all MBs have been encoded. If yes, the process is complete with respect to the instant frame. If all MBs have not been coded, then the next MB may be selected at step 1252, and the process continues with step 1226 for that next MB.

In one embodiment, reference picture management (RPM) may used to dynamically manage one or more reference frame buffers of the system. For example, the encoder 104 may include a reference frame buffer that stores reference frames previously transmitted to the receiver. The decoder 112 may also include a reference frame buffer that stores reference frames previously received from the encoder 104. By way of example, the reference frames stored in the reference frame buffers at the encoder 104 and the decoder 112 may be used to implement one or more error correction policies consistent with various embodiments of the system.

In some embodiments, the frames stored in the reference frame buffer at the decoder 112 may be different from the frames transmitted by the encoder 104. For example, a frame transmitted by the encoder 104 may have been damaged or corrupted before arriving at the decoder 112. In this example, the decoder may perform error concealment on a received frame consistent with the various embodiments disclosed herein and may further store the concealed reference frame in the reference frame buffer at the decoder. In one embodiment, because only the concealed version of the reference frame is available at the decoder 112, a motion estimation decision at the encoder 104 may be based on the concealed reference frame to avoid mismatch in a motion compensation prediction process. For example, the references frames stored in the reference frame buffer at the encoder 104 may be updated to correspond to the concealed reference frames stored in the reference frame buffer at the decoder 112. In an embodiment, the encoder may perform an update to a particular reference frame stored in the reference frame buffer at the encoder based on the feedback information corresponding to the particular reference frame received from the receiver.

In some embodiments, reference picture management (RPM) may be used to dynamically manage the reference frame buffers of the encoder 104 and the decoder 112. For example, the system may determine that a reference frame stored in the reference frame buffers at the encoder 104 and the decoder 112 should be deleted, for instance, if one or more of the reference frame buffers are full. For such an example, a reference frame may be chosen for deletion based on a condition for the reference frames. In one embodiment, the condition for the reference frames stored in the reference frame buffer of the encoder 104 may be calculated prior to encoding a frame for transmittal. In one embodiment, such as a condition may include a θ value for a particular reference frame, where θ may be defined as:

$$\theta = \Delta_{FN}\lambda + RPER$$

In the above equation, $\Delta_{FN}$ represents the frame number difference between a next frame to be encoded and the particular frame stored in the reference frame buffer, RPER represents the residual packet error rate of the channel, and λ represents a balancing factor, for example, a balancing factor that balances $\Delta_{FN}$ and RPER. By way of example, the reference frame with the highest θ value, or one or more reference frames with a θ value above a predetermined threshold, may be deleted. In one embodiment, when a particular reference frame is deleted from the reference frame buffer of the encoder 104, the reference frame buffer of the decoder 112 may receive an update that indicates the particular reference frame can no longer be used for error concealment.

Figure 13:
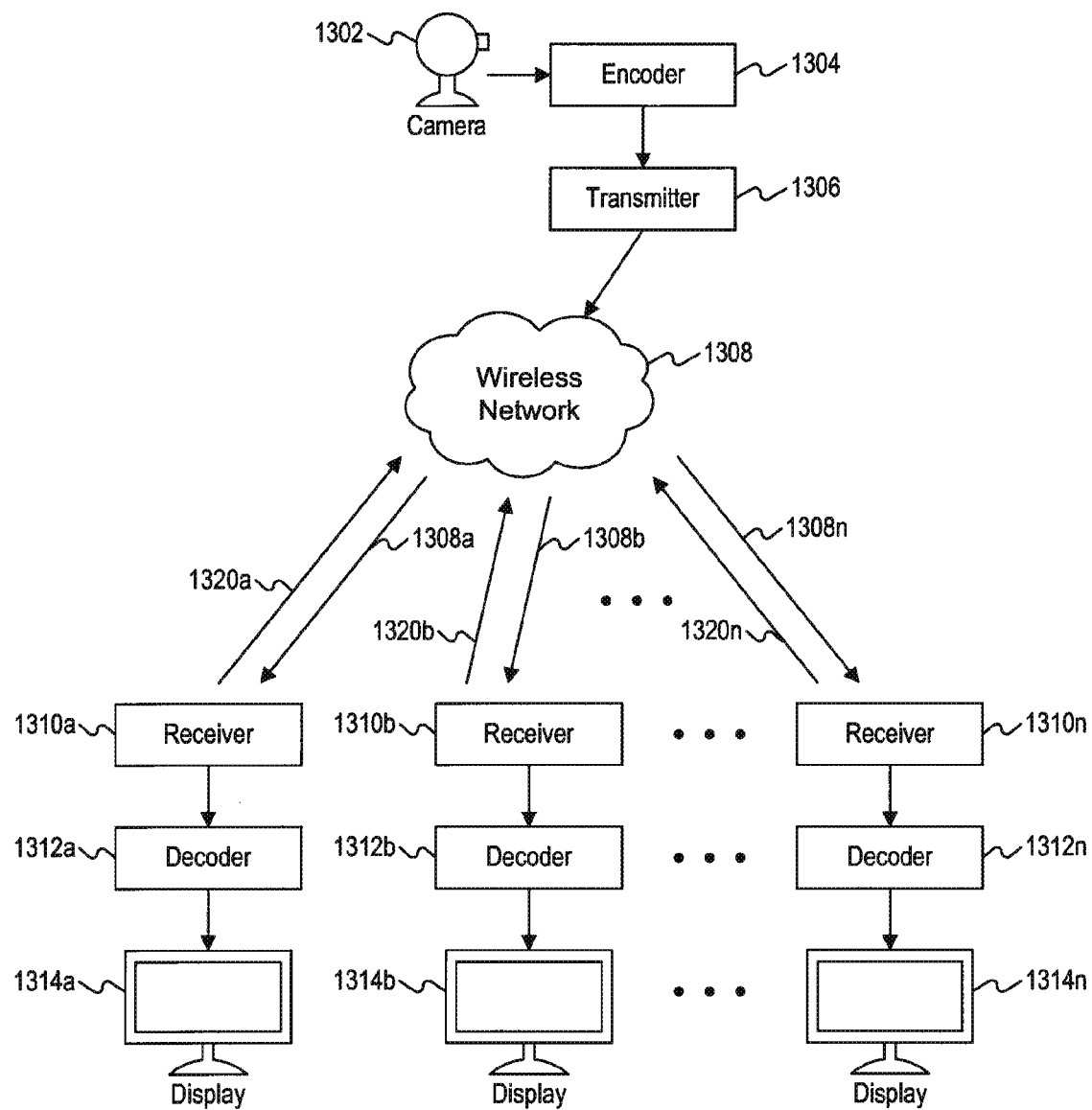
FIG. 13 illustrates a block diagram of exemplary components in an end-to-end system with a plurality of receivers consistent with the disclosed embodiments.

Consistent with the various embodiments disclosed above, one embodiment of a video transmission system includes an encoder and a plurality of decoders, as illustrated in FIG. 13. A video camera 1302 may capture video frames at a certain frame rate (e.g., 25 frames/second) and the captured video frames may be transmitted to the encoder 1304. The encoder 1304 may then encode the received video frames. In some embodiments, the camera 1302 is not included in the system and the encoder 1304 receives video frames from one or more sources. The encoded video may then be transmitted over a wireless network 1308 as video packets using transmitter 1306. A plurality of receivers 1310a, 1310b, through 1310n may be connected to the wireless network 1308 via their respective wireless channels 1308a, 1308b, through 1308n. In one embodiment, one or more receivers may be connected to the wireless network over the same wireless channel. At the receiver side, receivers 1310a-n may receive the video packet and may further produce an acknowledgement (feedback, 1320a-n). The receivers 1310a-n may send their respective acknowledgments over, for example, one or more wireless feedback channels to the transmitter 1306. The feedback 1320a-n may inform the transmitter 1306 or the encoder 1304 that the transmitted video packet was successfully received or unsuccessfully received at the respective receiver 1310a-n. The video packet may be decoded by decoders 1312a-n and reconstructed video may be presented on displays 1314a-n. Although shown separately, encoder 1304 and transmitter 1306 may be integrally formed and function as a single component. Likewise, one or more of the receivers 1310a-n and its corresponding decoder from the decoders 112a-n may also be integrally formed and function as a single component.

In a one embodiment, the plurality receiver system comprises a small number of receivers, for example, 2 to 8 receivers. However, in some embodiments, the system may also comprise more than 8 receivers.

Consistent with the disclosed embodiments and as an example, the encoder of the plurality receiver system may be an encoder similar to that depicted in FIG. 3. The receivers 1310a-n may be any device (computer, telephone, PDA, and the like) that can receive the encoded video stream. A (wireless) modem in the receivers may be configured to return the feedback 1320a-n, upon which embodiments rely.

In one embodiment, a PER may be calculated for each of the wireless channels 1308a-n. For example, a PER for each of the wireless channels may be calculated before encoding a next video frame. In another embodiment, a variation in the PER for the wireless channels may be calculated. For example, a variation in the PER for the wireless channels may be calculated before encoding a next video frame. In one embodiment, the transmitter 1306 or the encoder 1304 may determine how best to handle any lost packet(s) and how to encode a next video frame based on the feedback information from the receivers 1310a-n, the PER for the respective wireless channels 1308a-n, the variation in PER for the wireless channels 1308a-n, or a combination of these.

Consistent with the disclosed embodiments, a video frame may be divided into macroblocks (MBs) and how a macroblock is encoded (INTRA-, INTER- or SKIP-mode) may be decided by coding control. The transmitter 106 may put the encoded video stream into fixed size or variable size video packets and may send them over the wireless network 1308 to the receivers 1310a-n. As discussed, a first captured frame may be encoded independently as an I-frame and the other frames may be encoded depending on the previous frame as P-frames.

Consistent with the disclosed embodiments, the receivers 1310a-n may perform error concealment for a received frame. For example, the receivers may perform spatial error concealment, temporal error concealment, or a combination of these.

In one embodiment, the encoder 1304 and the decoders 1312a-n may each include a reference frame buffer. For example, the reference frames stored in the reference frame buffers at the encoder 1304 and the decoders 1312a-n may be used to implement one or more error correction policies consistent with various embodiments of the system.

In some embodiments, the frames stored in the reference frame buffers at the decoders 1312a-n may be different from the frames transmitted by the encoder 104. For example, a frame transmitted by the encoder 104 may have been damaged or corrupted before arriving at one of the decoders 1312a-n. In this example, this particular decoder may perform error concealment on a received frame and may further store the concealed reference frame in the reference frame buffer at the particular decoder. In one embodiment, because only the concealed version of the reference frame is available at the particular decoder, a motion-estimation decision at the encoder may be based on the concealed reference frame to avoid mismatch in a motion-compensation prediction process. For example, the references frames stored in the reference frame buffer at the encoder may be updated to correspond to the concealed reference frames stored in the reference frame buffer at the particular decoder.

In another embodiment, a decision to perform the same error concealment on the corresponding reference frame stored in the reference frame buffer at the encoder may be based on a condition. The condition may be, for example, a PER for the wireless channel corresponding to the particular receiver that performed the error concealment being below a certain threshold, a PER for the remaining wireless channels being below a certain threshold, a variation in the PER for the wireless channels being below a certain threshold, or a combination of any of these.

Consistent with the disclosed embodiments, the encoder 1304 or the transmitter 1306 may perform channel adaptive retransmission. For example, the encoder 1304 or the transmitter 1306 may perform spatial retransmission, temporal retransmission, or a combination of these. In one embodiment, the decision to perform spatial retransmission, temporal retransmission, or a combination may be based on a condition. The condition may be, for example, a PER for a particular wireless channel that requires retransmission of a packet being below a certain threshold, a PER for the remaining wireless channels being below a certain threshold, a variation in the PER for the wireless channels being below a certain threshold, or a combination of these.

Figure 14:
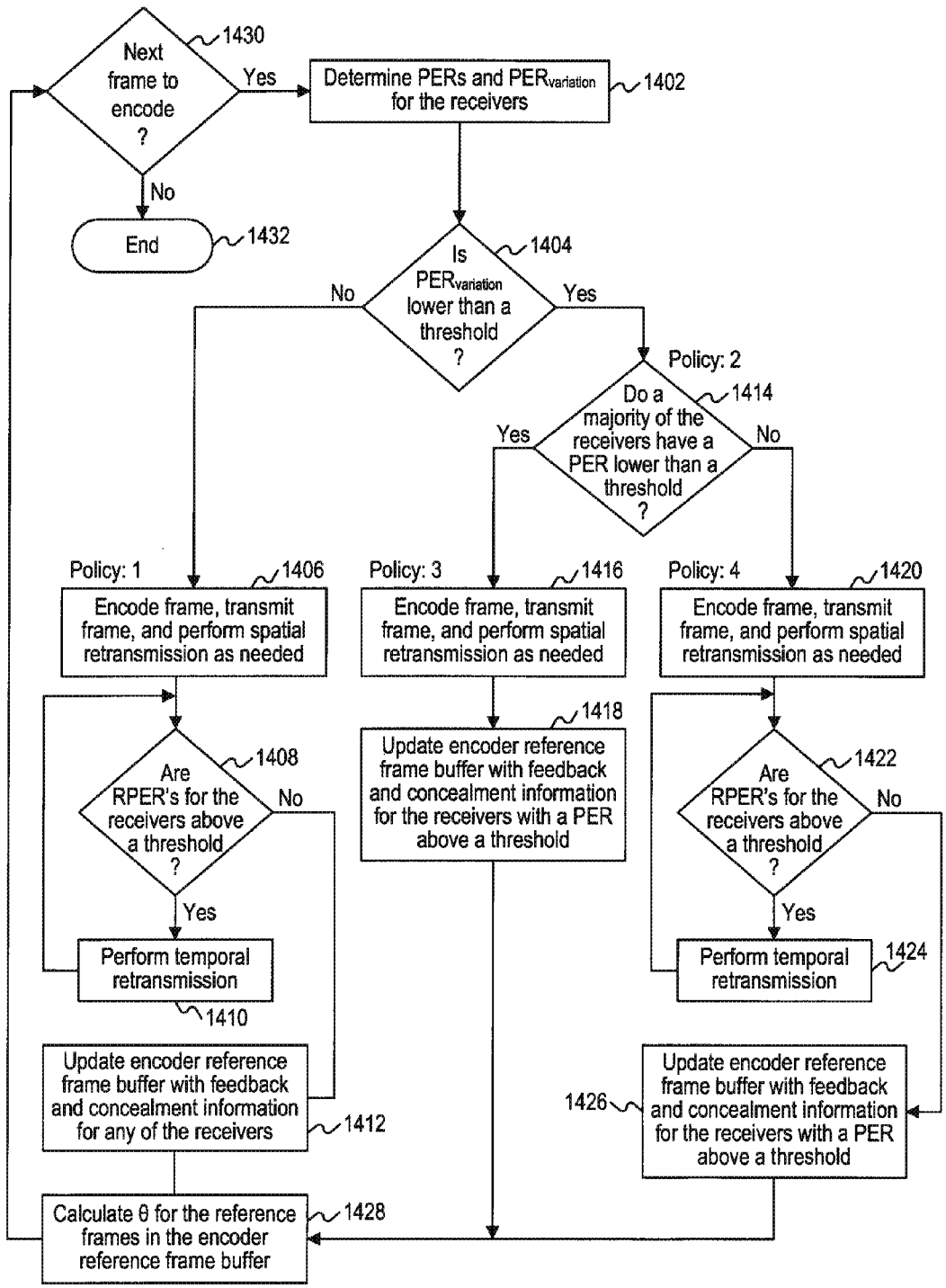
FIG. 14 shows an flowchart illustrating exemplary steps performed by an encoder when implementing error-correction policies consistent with various embodiments.

As discussed, in various embodiments, forms of error concealment and retransmission may be used to correct errors in the transmission of video, for instance packet loss or corruption. FIG. 14 illustrates various embodiments of error-correction policies for a multiple receiver system.

In one embodiment, flowchart 1400 illustrates various examples of error-correction policies that may be implemented. At step 1402, the PERs for the wireless channels and the $PER_{variation}$ (the variation in the PERs for the wireless channels) may be determined. The PERs and $PER_{variation}$ may be determined based on, for example, feedback information from the receivers. At step 1404, the $PER_{variation}$ may be compared to a threshold value. If the $PER_{variation}$ is below a threshold, the process may continue to step 1406 to implement a first error-correction policy. If the $PER_{variation}$ is above a threshold value, the process may continue to step 1414 to implement a second error-correction policy.

At step 1406, a frame may be encoded and transmitted, and spatial retransmission may be performed as needed. For example, the encoder or the transmitter may encode and transmit the frame consistent with the disclosed embodiments. In addition, spatial retransmission may be performed consistent with the disclosed embodiments. For example, the encoding bit rate may be reduced by using coarser quantization for encoding the current frame so that bits may be used to retransmit lost or corrupted packets. In some embodiments, only lost or corrupted packets corresponding to feedback from a receiver on a channel with a PER below a threshold may be retransmitted. In another embodiment, a decision to reduce the bit rate of an encoding by using a coarser quantization may be based on feedback from receivers on wireless channels with a PER below a threshold. The process may then continue to step 1408.

At step 1408, the RPERs for the wireless channels may be determined and the RPERs may be compared to a threshold. For example, the RPER for each wireless channel may be compared to a threshold, and if any of the RPERs are determined to be above the threshold, the process may continue to step 1410 to perform temporal retransmission. If the RPERs are determined to be below a threshold, the process may continue step 1412 to perform reference frame buffer updates.

At step 1410, temporal retransmission may be performed. For example, temporal retransmission may be performed consistent with the disclosed embodiments. The process may then return to step 1408 to determine whether the updated RPERs for the wireless channels are below a threshold. In one embodiment, temporal retransmission may be performed until the RPERs for the wireless channels fall below a threshold. Then, the process may continue to step 1412.

At step 1412, reference frame buffer updates may be performed at the encoder. For example, the reference frame buffer at the encoder may be updated with error-concealment information and feedback information, for instance, lost or corrupt packet information, from the receivers. In one embodiment, a reference frame stored in the reference frame buffer at the encoder may be updated with the same error concealment that was performed on the corresponding reference frame at the receivers. In another embodiment, a reference frame stored in the reference frame buffer at the encoder may be updated with lost or corrupt packet information for the reference frame from the receivers. The process may then continue to step 1412 to calculate a $\theta$ value for reference frames in the reference frame buffer at the encoder.

At step 1412, a $\theta$ value may be calculated for the references frames stored in the reference frame buffer at the encoder. For example, a $\theta$ value may be calculated for the references frames stored in the reference frame buffer at the encoder consistent with various embodiments disclosed above. In an embodiment, a reference frame with the highest $\theta$ value may be deleted from the reference frame buffer at the encoder consistent with various embodiments disclosed above. The process may then continue to step 1430.

At step 1430, it may be determined whether a next frame is to be encoded. For example, if a next frame is to be encoded, the process may revert back to step 1402 and repeat the process. In one embodiment, if it is determined that a next frame will not be encoded, the process may end at step 1432.

At step 1414, it may be determined whether a majority of the channels have a PER below a threshold. For example, if it is determined that a majority of channels have a PER below a threshold value, the process may continue to step 1416 to implement a third error correction policy. If it is determined that a majority of channels have a PER above a threshold value, the process may continue to step 1420 to implement a fourth error correction policy.

At step 1416, a frame may be encoded, transmitted, and spatial retransmission may be performed as needed. For example, the encoder or the transmitter may encode and transmit the frame consistent with various embodiments disclosed above. In addition, spatial retransmission may be performed consistent with various embodiments disclosed above. For example, the encoding bit rate may be reduced by using coarser quantization for encoding the current frame so that bits may be used to retransmit lost or corrupted packets. In some embodiments, only lost or corrupted packets corresponding to feedback from a receiver on a channel with a PER below a threshold may be retransmitted. In a further embodiment, receivers on channels with a PER higher than the threshold may choose to perform error concealment or, if the picture quality is still poor, may choose to not display the frame at all. In another embodiment, a decision to reduce the bit rate of an encoding by using a coarser quantization may be based on feedback from receivers on wireless channels with a PER below a threshold. The process may then continue to step 1418.

At step 1418, reference frame buffer updates may be performed at the encoder. For example, the reference frame buffer at the encoder may be updated with error-concealment information and feedback information, such lost- or corrupt-packet information, from the receivers. In one embodiment, a reference frame stored in the reference frame buffer at the encoder may be updated with the same error concealment that was performed on the corresponding reference frame at the receivers. In another embodiment, a reference frame stored in the reference frame buffer at the encoder may be updated with lost or corrupt packet information for the reference frame from the receivers. In one embodiment, only updates that correspond to receivers on a channel with a PER below a threshold may be performed. The process may then continue to step 1412 to calculate a 0 value for reference frames in the reference frame buffer at the encoder. The process may proceed from step 1412 as disclosed above.

At step 1420, a frame may be encoded and transmitted, and spatial retransmission may be performed as needed. For example, the encoder or the transmitter may encode and transmit the frame consistent with various embodiments disclosed above. In addition, spatial retransmission may be performed consistent with various embodiments disclosed above. For example, the encoding bit rate may be reduced by using coarser quantization for encoding the current frame so that bits may be used to retransmit lost or corrupted packets. In some embodiments, only lost or corrupted packets corresponding to feedback from a receiver on a channel with a PER below a threshold may be retransmitted. In a further embodiment, receivers on channels with a PER higher than the threshold may choose to perform error concealment or, if the picture quality is still poor, may choose to not display the frame at all. In another embodiment, a decision to reduce the bit rate of an encoding by using a coarser quantization may be based on feedback from receivers on wireless channels with a PER below a threshold. The process may then continue to step 1422.

At step 1422, the RPERs for the wireless channels may be determined and the RPERs may be compared to a threshold. For example, the RPER for each wireless channel may be compared to a threshold, and if any of the RPERs are determined to be above the threshold, the process may continue to step 1424 to perform temporal retransmission. If the RPERs are determined to be below a threshold, the process may continue step 1426 to perform reference frame buffer updates.

At step 1424, temporal retransmission may be performed. For example, temporal retransmission may be performed consistent with various embodiments disclosed above. The process may then return to step 1422 to determine whether the updated RPERs for the wireless channels are below a threshold. In one embodiment, temporal retransmission is performed until the RPERs for the wireless channels fall below a threshold. Then, the process may continue to step 1426.

At step 1426, reference frame buffer updates may be performed at the encoder. For example, the reference frame buffer at the encoder may be updated with error concealment information and feedback information, such lost- or corrupt-packet information, from the receivers. In one embodiment, a reference frame stored in the reference frame buffer at the encoder may be updated with the same error concealment that was performed on the corresponding reference frame at the receivers. In another embodiment, a reference frame stored in the reference frame buffer at the encoder may be updated with lost or corrupt packet information for the reference frame from the receivers. In one embodiment, only updates that correspond to receivers on a channel with a PER below a threshold may be performed. The process may then continue to step 1412 to calculate a 0 value for reference frames in the reference frame buffer at the encoder. The process may proceed from step 1412 as disclosed above.

It will be apparent to those skilled in the art that various modifications and variations can be made in the systems and methods disclosed herein consistent with the principles of the various embodiments disclosed without departing from the scope or spirit of the invention. Although several embodiments have been disclosed above, other variations are possible. It is intended that the specification and examples be considered as exemplary only, with a true scope of the disclosure being indicated by the following claims and their equivalents.

We claim:

1. A method for providing error-resilient digital video content, comprising:
   receiving video data reflective of multiple video frames;
   encoding, with an encoding device, the video data to generate a plurality of packets representing a video frame;
   transmitting the first group of packets to at least two receivers;
   receiving, from the at least two receivers, feedback information regarding receiving status of respective ones of the plurality of packets, the feedback information being indicative of packets not received correctly;
   examining error indications regarding the at least two receivers based on the feedback information received from the at least two receivers; and
   implementing a first error-correction policy if a variation in the error indications among the at least two receivers is below a first error threshold and a second error-correction policy if the variation is above the first error threshold,
   wherein at least one of the first and second error-correction policies comprises transmitting or retransmitting at least one packet using a coding scheme different from a scheme in encoding the plurality of packets already.

2. The method of claim 1, wherein examining error indications regarding the at least two receivers comprises calculating, based on the feedback information, a packet error rate (PER) for the at least two receivers and the variation in the error indications comprises a variation in the PER for the at least two receivers.

3. The method of claim 1, wherein the implementing of one of the first and second error-correction policies applies to at least one of an encoding of retransmission packets for the video frame and an encoding of a plurality packets for a subsequent video frame.

4. The method of claim 1, wherein the first error-correction policy comprises determining, based on the error indication for the at least two receivers, whether to retransmit, in a same time slot as a subsequent video frame, one or more of the packets not received correctly.

5. The method of claim 1, wherein implementing the second error correction policy further comprises implementing a third error-correction policy if a majority of the at least two receivers have an error indication below a second error threshold and a fourth error-correction policy if the majority of the at least two receivers have an error indication above the second error threshold.

6. The method of claim 5, wherein at least one of the first and the fourth error-correction policies further comprises determining, based on the error indication for the at least two receivers, a quantizing parameter.

7. The method of claim 5, wherein at least one of the first, third, and fourth error-correction policies comprises performing error-concealment at the encoder in a reference video frame that is used in encoding the video data.

8. The method of claim 7, wherein, for at least one of the first and fourth error-correction policies, performing the error-concealment comprises performing synchronized error-concealment based on an error-concealment performed at a receiver-side decoder.

9. The method of claim 7, wherein, for the third error-correction policy, performing the error concealment comprises performing synchronized error-concealment based on an error-concealment performed at a receiver-side decoder corresponding to receivers having an error indication below the second error threshold.

10. The method of claim 5, wherein the third error-correction policy comprises determining, based on the error indication for a receiver that has an error indication below the second error threshold, a quantizing parameter for a subsequent frame of video.

11. The method of claim 5, wherein the third error-correction policy comprises determining, based on the error indication for a receiver that has an error indication below the second error threshold, whether to retransmit one or more lost packets in a same time slot as the subsequent frame of video.

12. The method of claim 1, further comprising dynamically adjusting a reference frame buffer, wherein dynamically adjusting the reference frame buffer further comprises removing a reference frame from the reference frame buffer based on a residual packet error rate (RPER) for the plurality of receivers and a relationship between the reference frame and a frame to be encoded.

13. The method of claim 1, wherein at least one of the first, third, and fourth error-correction policies includes performing an error-concealment comprising:
   identifying a portion of the video frame that is missing;
   locating the missing portion of the video frame from a previous frame, the previous frame comprising one of an i-1, i-2, and an i-n frames; and
   concealing the frame with a located portion from the previous frame.

14. A system for providing error-resilient digital video, comprising:
   an encoder configured to receive video data reflective of multiple video frames and encode the video data to generate a plurality of packets representing a video frame;
   a transmitter coupled with the encoder, the transmitter being configured to transmit the first group of packets to at least two receivers and receive from the at least two receivers, feedback information regarding receiving status of respective ones of the plurality of packets, the feedback information being indicative of packets not received correctly; and
   a processor coupled with the encoder and the transmitter, the processor being configured to examine error indications regarding the at least two receivers based on the feedback information received from the at least two receivers and to implement a first error-correction policy if a variation in the error indications among the at least two receivers is below a first error threshold and a second error-correction policy if the variation is above the first error threshold,
   wherein at least one of the first and second error-correction policies comprises transmitting or retransmitting at least one packet using a coding scheme different from a scheme in encoding the plurality of packets already.

15. The system of claim 14, wherein the processor examines error indications regarding the at least two receivers and calculate, based on the feedback information, a packet error rate (PER) for the at least two receivers and the variation in the error indications comprises a variation in the PER for the at least two receivers.

16. The system of claim 14, wherein the processor implements one of the first and second error-correction policies for at least one of an encoding of retransmission packets for the video frame and an encoding of a plurality packets for a subsequent video frame.

17. The system of claim 14, wherein the first error-correction policy comprises determining, based on the error indication for the at least two receivers, whether to retransmit, in a same time slot as a subsequent video frame, one or more of the packets not received correctly.

18. The system of claim 14, wherein the processor further implements a third error-correction policy if a majority of the at least two receivers have an error indication below a second error threshold and a fourth error-correction policy if the majority of the at least two receivers have an error indication above the second error threshold.

19. The system of claim 18, wherein at least one of the first and fourth error-correction policies comprises determining, based on the error indication for the at least two receivers, a quantizing parameter.

20. The system of claim 18, wherein at least one of the first, third, and fourth error-correction policies comprises performing error-concealment at the encoder in a reference video frame that is used in encoding the video data.

21. The system of claim 20, wherein, for at least one of the first and fourth error-correction policies, performing the error-concealment comprises performing synchronized error-concealment based on an error-concealment performed at a receiver-side decoder.

22. The system of claim 20, wherein, for the third error-correction policy, performing the error concealment comprises performing synchronized error-concealment based on an error-concealment performed at a receiver-side decoder corresponding to receivers having an error indication below the second error threshold.

23. The system of claim 18, wherein the third error-correction policy comprises determining, based on the error indication for a receiver that has an error indication below the second error threshold, a quantizing parameter for a subsequent frame of video.

24. The system of claim 18, wherein the third error-correction policy comprises determining, based on the error indication for a receiver that has an error indication below the second error threshold, whether to retransmit one or more lost packets in a same time slot as the subsequent frame of video.

25. The system of claim 14, further comprising dynamically adjusting a reference frame buffer, wherein dynamically adjusting the reference frame buffer further comprises removing a reference frame from the reference frame buffer based on a residual packet error rate (RPER) for the plurality of receivers and a relationship between the reference frame and a frame to be encoded.

26. The system of claim 14, wherein at least one of the first, third, and fourth error-correction policies includes performing an error-concealment comprising:
 identifying a portion of the video frame that is missing;
 locating the missing portion of the video frame from a previous frame, the previous frame comprising one of an i-1 frame, i-2, and i-n frames; and
 concealing the frame with a located portion from the previous frame.

27. A non-transitory tangibly embodied computer-readable storage medium including instructions that, when executed by a processor, perform a method for providing error-resilient digital video, the method comprising: receiving video data reflective of multiple video frames; encoding, with an encoding device, the video data to generate a plurality of packets representing a video frame; transmitting the first group of packets to at least two receivers; receiving, from the at least two receivers, feedback information regarding receiving status of respective ones of the plurality of packets, the feedback information being indicative of packets not received correctly; examining error indications regarding the at least two receivers based on the feedback information received from the at least two receivers; and implementing a first error-correction policy if a variation in the error indications among the at least two receivers is below a first error threshold and a second error-correction policy if the variation is above the first error threshold, wherein at least one of the first and second error-correction policies comprises transmitting or retransmitting at least one packet using a coding scheme different from a scheme in encoding the plurality of packets already.

28. The method of claim 27, wherein examining error indications regarding the at least two receivers comprises calculating, based on the feedback information, a packet error rate (PER) for the at least two receivers and the variation in the error indications comprises a variation in the PER for the at least two receivers.

29. The method of claim 27, wherein the implementing of one of the first and second error-correction policies applies to at least one of an encoding of retransmission packets for the video frame and an encoding of a plurality packets for a subsequent video frame.

30. The method of claim 27, wherein the first error-correction policy comprises determining, based on the error indication for the at least two receivers, whether to retransmit, in a same time slot as a subsequent video frame, one or more of the packets not received correctly.

31. The method of claim 27, wherein implementing the second error correction policy further comprises implementing a third error-correction policy if a majority of the at least two receivers have an error indication below a second error threshold and a fourth error-correction policy if the majority of the at least two receivers have an error indication above the second error threshold.

32. The method of claim 31, wherein at least one of the first and fourth error-correction policies further comprises determining, based on the error indication for the at least two receivers, a quantizing parameter.

33. The method of claim 31, wherein at least one of the first, third, and fourth error-correction policies comprises performing error-concealment at the encoder in a reference video frame that is used in encoding the video data.

34. The method of claim 33, wherein, for at least one of the first and fourth error-correction policies, performing the error-concealment comprises performing synchronized error-concealment based on an error-concealment performed at a receiver-side decoder.

35. The method of claim 33, wherein, for the third error-correction policy, performing the error concealment comprises performing synchronized error-concealment based on an error-concealment performed at a receiver-side decoder corresponding to receivers having an error indication below the second error threshold.

36. The method of claim 31, wherein the third error-correction policy comprises determining, based on the error indication for a receiver that has an error indication below the second error threshold, a quantizing parameter for a subsequent frame of video.

37. The method of claim 31, wherein the third error-correction policy comprises determining, based on the error indication for a receiver that has an error indication below the second error threshold, whether to retransmit one or more lost packets in a same time slot as the subsequent frame of video.

38. The method of claim 27, further comprising dynamically adjusting a reference frame buffer, wherein dynamically adjusting the reference frame buffer further comprises removing a reference frame from the reference frame buffer based on a residual packet error rate (RPER) for the plurality of receivers and a relationship between the reference frame and a frame to be encoded.

39. The method of claim 27, wherein at least one of the first, third, and fourth error-correction policies includes performing an error-concealment comprising:
    identifying a portion of the video frame that is missing;
    locating the missing portion of the video frame from a previous frame, the previous frame comprising one of an i-1, i-2, and i-n frames; and
    concealing the frame with a located portion from the previous frame.

\* \* \* \* \*